United States Patent
Kennedy et al.

(10) Patent No.: US 11,249,740 B1
(45) Date of Patent: Feb. 15, 2022

(54) SYSTEMS AND METHODS FOR FACILITATING MORE EFFICIENT DOWNLOADING OF THIRD PARTY SOFTWARE APPLICATIONS

(71) Applicant: Gamesys Ltd., London (GB)

(72) Inventors: Cameron Kennedy, London (GB); Liam Ford, London (GB); James Clement, London (GB)

(73) Assignee: Gamesys Ltd., London (GB)

( * ) Notice: Subject to any disclaimer, the term of this patent is extended or adjusted under 35 U.S.C. 154(b) by 968 days.

(21) Appl. No.: 15/098,354

(22) Filed: Apr. 14, 2016

Related U.S. Application Data

(60) Provisional application No. 62/146,962, filed on Apr. 14, 2015.

(51) Int. Cl.
  *G06F 8/61* (2018.01)
  *H04L 29/08* (2006.01)
  *H04W 4/50* (2018.01)

(52) U.S. Cl.
  CPC .............. *G06F 8/61* (2013.01); *H04L 67/02* (2013.01); *H04W 4/50* (2018.02)

(58) Field of Classification Search
  CPC .......... G06F 8/61; H04L 67/02; H04W 4/001; G07F 17/3211; G07F 17/323; G07F 17/3206; G06T 19/006; G06T 15/405; G06K 9/00664; G06K 9/00671; A63F 2300/1093; A63F 2300/203; A63F 2300/308; A63F 2300/6045; A63F 2300/66; A63F 2300/69; A63F 2300/8082
  USPC ....................................... 717/178
  See application file for complete search history.

(56) References Cited

U.S. PATENT DOCUMENTS

| | | | |
|---|---|---|---|
| 9,305,162 B2 * | 4/2016 | Yuen | H04L 63/168 |
| 2013/0281206 A1 * | 10/2013 | Lyons | G07F 17/3211 463/33 |

* cited by examiner

*Primary Examiner* — Wei Y Zhen
*Assistant Examiner* — Mohammed N Huda
(74) *Attorney, Agent, or Firm* — RowanTree Law Group, PLLC; Carson C. K. Fincham

(57) ABSTRACT

Systems and methods for automatically managing and increasing the efficiency of non-authorized software installation such as on mobile devices having restricted operating systems.

8 Claims, 11 Drawing Sheets

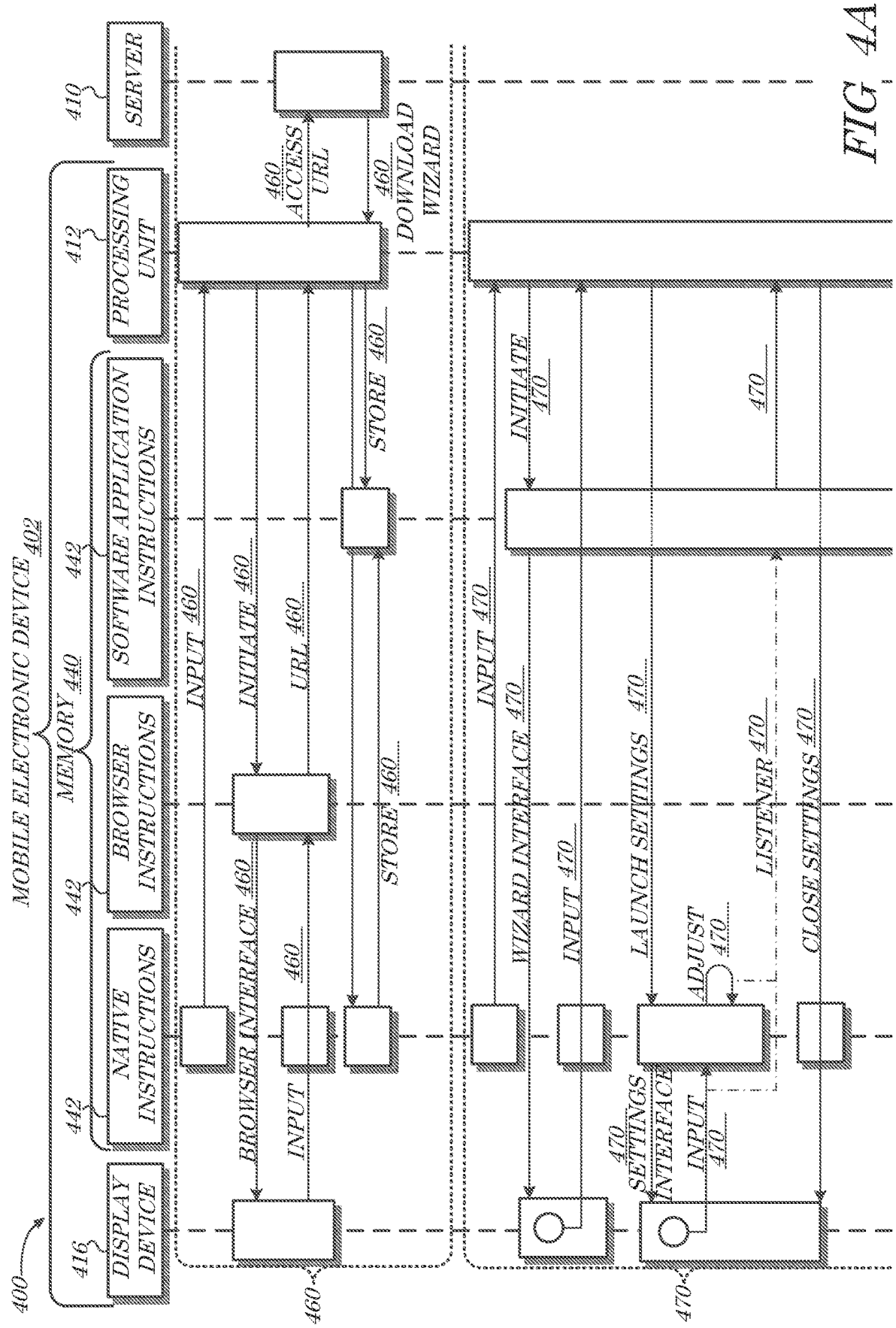

SYSTEMS AND METHODS FOR FACILITATING MORE EFFICIENT DOWNLOADING OF THIRD PARTY SOFTWARE APPLICATIONS

CROSS-REFERENCE TO RELATED APPLICATIONS

The present applications claims priority under 35 U.S.C. § 119(e) to, and is a non-provisional of, U.S. Provisional Patent Application No. 62/146,962 filed on Apr. 14, 2015, the contents of which are hereby incorporated by reference herein.

COPYRIGHT NOTICE

A portion of the disclosure of this application contains material that is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND

While downloading and installing software applications on mobile electronic devices has become commonplace, the applications that may be installed are generally limited, at least with respect to many mobile electronic devices running restricted or closed operating systems, to pre-approved software applications, such as applications available for download via a proprietary application marketplace.

Software applications that are not pre-approved or authorized are either not capable of downloading or installing, or require special steps by the user such as changing certain settings of their mobile electronic device to enable non-authorized software installation. The steps required for such enabling or authorization vary depending upon the type of device, operating system type and version, etc.

BRIEF DESCRIPTION OF THE FIGURES

An understanding of embodiments described herein and many of the attendant advantages thereof may be readily obtained by reference to the following detailed description when considered with the accompanying drawings, wherein:

FIG. 4A and FIG. 4B are flowcharts of a method according to some embodiments;

DETAILED DESCRIPTION OF EXAMPLE EMBODIMENTS

Figure 1:
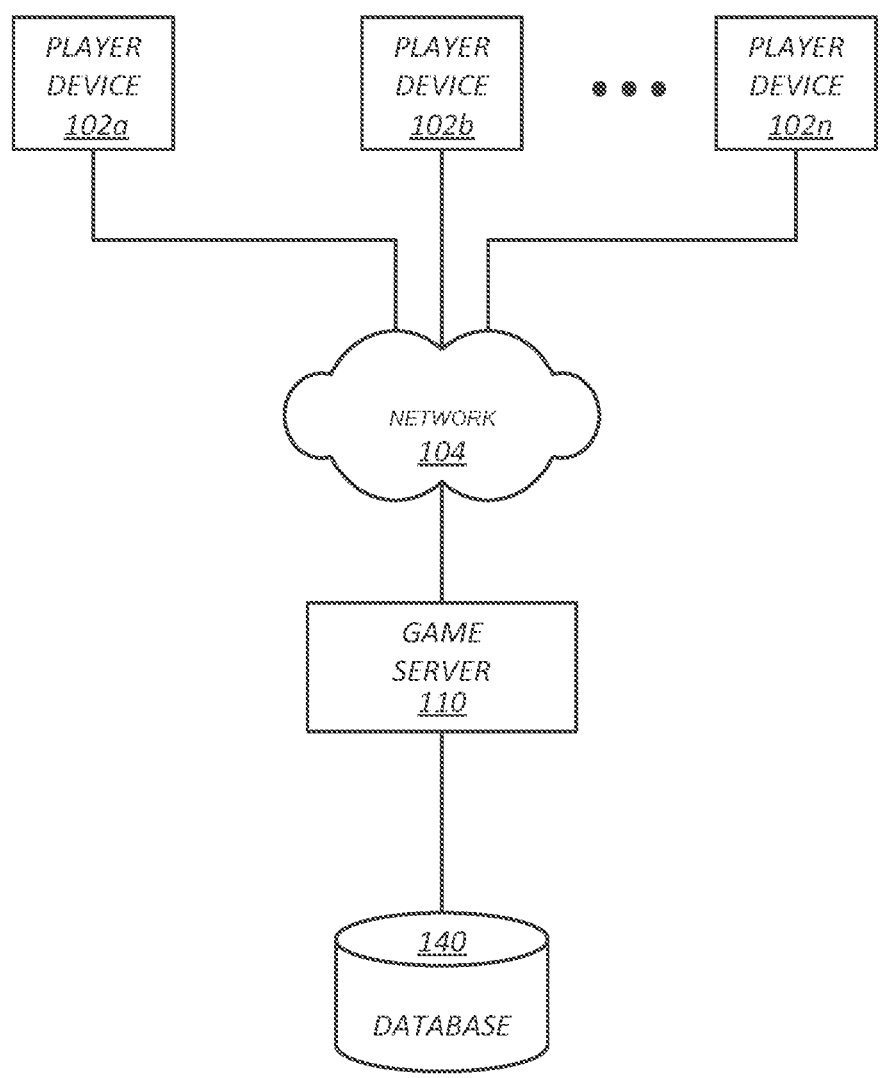
FIG. 1 is a schematic diagram of an embodiment of a gaming system in accordance with one or more embodiments described herein.

Applicant has recognized that for some computing devices it is sometimes problematic to download and/or install software applications under certain circumstances. For example, some computing devices include restrictions (e.g., restricted or "closed" operating systems) which make it more difficult or time consuming to download and/or install to the computing devices certain software applications which are considered non-authorized software applications. A software application may be considered non-authorized, for example, by virtue of it being available from a non-authorized source or third party or because it is for a non-authorized activity (e.g., a wagering game or a non-work related activity when the computing device is a device intended primarily for work-related activities). For example, some computing device manufacturers or other providers prefer that users only install software applications from an authorized online store and only software applications which are downloaded from the authorized online store are considered authorized software applications and are thus automatically installed (or automatically enabled or authorized for install) on the computing device. Thus, some computing device manufacturers or other providers require that additional steps (in addition to a regular process of downloading a software application to the computing device) be performed prior to a non-authorized software application being installed on the computing device. As used herein, a user may be any type of user of a computing device such as a player device (and a player device may comprise any type of computing and/or network device, including a mobile electronic device such as a smartphone). In the context of games (e.g., wagering games) a user may comprise a player as the term is defined herein.

Applicant has invented and describes herein a novel software application (which may, in some embodiments, be embodied as a sub-routine or module of a larger program), which facilitates downloading and installation of a non-authorized software application onto a computing device (such as a player device). The software application (at least a portion of which is referred to as an "installation wizard" herein) provides for more efficient downloading and/or installation of the non-authorized software application. In some embodiments, the installation wizard may be a component or module of the non-authorized software application which a user desires to install on his computing device. In particular, in accordance with one embodiment, an installation wizard provides for (i) outputting on a display of the computing device a first interface of a non-authorized software application, the first interface including a first interactive element or input mechanism (e.g., a virtual button or defined area of a touch-screen) and instructions, the instructions instructing a user of the computing device to actuate the first input mechanism in order to facilitate installation of the non-authorized software application on the computing device; (ii) upon determining that the user has actuated the first input mechanism, causing a particular user interface for modifying at least one setting of the computing device (a settings interface herein; e.g., an interface native to the mobile electronic device and/or operating system thereof) to be output on a display device of the computing device, wherein the at least one setting is for authorizing non-authorized software applications to be installed on the computing device, the settings screen including a second interactive element or input mechanism which, when set by the user to a first value, allows the computing device to install non-authorized software applications; (iii) monitoring (e.g., via the installation wizard) inputs to the computing device to determine whether the user has set the second input mechanism to (or utilized the second input mechanism to set) the first value; (iv) upon determining that the user has set the second input mechanism to the first value, automatically outputting on the display device of the computing device the first interface of the non-authorized software application (and/or a third interface defined by the installation wizard; e.g., not native to the mobile electronic device and/or the operating system thereof), the first interface (or third interface) now including a third interactive element or input mechanism, the third input mechanism for initiating an installation of the non-authorized (or previously non-authorized, e.g., prior to the setting being changed or adjusted) software application on the computing device; and/or (v) monitoring the progress of the installation, downloading or user input process.

In prior art processes, it is up to the user to go to a settings screen of the computing device (e.g., pick and choose which of many available setting screens to go to), find the appropriate setting to modify in order to allow installation of a non-authorized software application, select or enter the appropriate value to authorize the installation, and then go back to the screen of the non-authorized (previously non-authorized) software application and initiate the installation process after having adjusted or modified the setting (or settings, as the case may be for the particular device and/or operating system). In accordance with some embodiments, the non-authorized software application causes the computing device to take the user automatically to the appropriate settings screen (or screens) of the computing device and then, upon monitoring inputs and determining that the user has modified the appropriate setting(s) to allow installation of non-authorized software applications, to automatically return the user to the non-authorized (e.g., previously non-authorized) software application interface (or provide a new interface defined by the installation wizard) which has an input mechanism for initiating installation of the non-authorized software application. In some embodiments, the user is shown a temporary notification as a reminder of the settings to be changed. Thus, a subroutine or module (e.g., the installation wizard) of the non-authorized software application not only guides the user through the appropriate process for allowing the installation but automatically opens and closes native screens on the computing device, thus making the process of installing a non-authorized software application significantly more efficient and fast (and less confusing or intimidating) for the user. In accordance with some embodiments, the process may also suppress or omit a warning message which may otherwise be output to the user when the user modifies the settings of the computing device to allow installation of non-authorized software applications (e.g., a native message, pop-up window, and/or interface message or component may be bypassed, disabled, or automatically closed on behalf of the user).

Certain aspects, advantages, and novel features of the various embodiments of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed herein, it will be understood by those of ordinary skill in the art that the embodiments of the invention described herein extend beyond the specifically disclosed embodiments, examples and illustrations and includes other uses of the invention and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined generally throughout the present description.

The terms "information" and "data", as used herein unless specified otherwise, may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

The term "indication", as used herein unless specified otherwise, may refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

The term "network component," as used herein unless specified otherwise, may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

The term "player," as used herein unless specified otherwise, may refer to any type, quantity, and or manner of entity associated with the play of a game. In some embodiments, a player may comprise an entity (i) conducting play of an online game, (ii) that desires to play a game (e.g., an entity registered and/or scheduled to play and/or an entity having expressed interest in the play of the game—e.g., a spectator) and/or may (iii) that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise a virtual player (i.e., a player represented by software controlling betting decisions for a player position).

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

Turning initially to FIG. 1, illustrated therein is a block diagram of an example system 100 consistent with at least some embodiments. The system 100 may comprise a plurality of player devices 102a-n in communication with a game server 110 via a network 104. For purposes of brevity, any or all of the player devices 102a-n will be referred to as a player device 102 herein, even though the plurality of player devices 102a-n may include different types of player devices (as described below). The game server 110 may also be operable to communicate with or access a database 140 (which may comprise one or more databases and/or tables and which may comprise a storage device distinct from (or be a component of) the game server 110). It should be noted that in some embodiments database 140 may be stored on a game server 110 while in other embodiments database 140 may be stored on another computing device (not explicitly shown) with which game server 110 is operable to communicate in order to at least access the data in database 140 (e.g., another server device remote from game server 140, operable to determine outcomes for an event instance of a game). In some embodiments a processor (e.g., one or more microprocessors, one or more microcontrollers, one or more digital signal processors, or one or more processing units) of a player device 102 and/or game server 110 may receive instructions (e.g., from a memory or like device), and execute those instructions, thereby performing one or more processes defined by those instructions. Instructions may be embodied in, e.g., one or more computer programs and/or one or more scripts. In accordance with embodiments herein, the instructions may comprise first instructions defined by an operating system of a device (e.g., "native" instructions) and instructions defined by one or more software applications installed on the device (e.g., a network browser, e-mail program, or an installation wizard—e.g., for a non-authorized software application as described herein).

In some embodiments a game server 110 and/or one or more of the player devices 102 stores and/or has access to data useful for facilitating play of a game (e.g., a wagering game which may be played via a software application downloadable onto a player device). It should be noted that in some embodiments such data may be stored on the game server 110 and information based on such data may be output to a player device 102 during play of a game while in other embodiments a game program may be downloaded to a local memory of a player device 102 and thus such data may be stored on a player device 102 (e.g., in encrypted or other secure or tamper-resistant form).

A game server 110 may comprise a computing device for facilitating play of a game (e.g., by receiving an input from a player (e.g., a request to download a software application for playing a game), determining an outcome or data for a game (e.g., cards dealt and/or winner of the hand), causing data of a game (e.g., cards dealt) to be displayed on a player device, facilitating a wager and/or a provision of a payout for a game). For example, the game server 110 may comprise a server computer operated by a game provider or another entity (e.g., a social network website not primarily directed at providing games). In some embodiments, the game server may determine data (e.g., cards to be dealt to one or more players) for a game by requesting and receiving such data from another remote server operable to provide such data. In some embodiments, the game server 110 may further be operable to facilitate a game program for a game (e.g., a wagering game). In accordance with some embodiments, in addition to administering or facilitating play of a game, a game server 110 may comprise one or more computing devices responsible for handling online processes such as, but not limited to: serving a website comprising an installation wizard and/or one or more games, e.g., to a player device and/or processing transactions (e.g., wagers, deposits into financial accounts, managing accounts, controlling games, etc.). In some embodiments, game server 110 may comprise two or more server computers operated by the same entity (e.g., one server being primarily for storing states of games in progress and another server being primarily for storing mechanisms for determining outcomes of games, such as a random number generator).

Turning now to a description of a player device 102, in accordance with some embodiments a player device 102 may comprise a computing device that is operable to execute or facilitate the execution of a game program and used or useful by an online player for accessing an online casino or other electronic (e.g., online) game provider. For example, a player device 102 may comprise a desktop computer, computer workstation, laptop, mobile device, tablet computer, Personal Digital Assistant (PDA) devices, cellular or other wireless telephones (e.g., the Apple™ iPhone™), video game consoles (e.g., Microsoft™ Xbox 360™, Sony™ Playstation™ and/or Nintendo™ Wii™), and/or handheld or portable video game devices (e.g., Nintendo™ Game Boy™ or Nintendo™ DS™). A player device 102 may comprise and/or interface with various components such as input and output devices (each of which is described in detail elsewhere herein) and, in some embodiments, game server 110. A player device 102 may be a dedicated gaming device (e.g., a slot machine or video poker type of machine) or a non-dedicated gaming device (e.g., a smart phone, tablet, laptop or desktop computer). It should be noted that a game server 110 may be in communication with a variety of different types of player devices 102.

A player device 102 may be used to play a wagering or non-wagering game (e.g., a social or casual game) over a network and output information relating to the game to players participating in the game (e.g., cards dealt for a hand of the game, updating a betting progress indicator based on one or more bet decisions of players, credit balance of credits available for play of the game, etc.). Any and all information relevant to any of the aforementioned functions may be stored locally on one or more of the player devices 102 and/or may be accessed using one or more of the player devices 102 (in one embodiments such information being stored on, or provided via, the game server 110 and/or the database 140). In some embodiments, a player device 102 may store (e.g., after a game software application is downloaded and installed on the player device) some or all of the program instructions for determining, for example, (i) that an event instance has been triggered or initiated, (ii) receiving wager/bet decisions from players and outputting an indication of such bet decisions to the other players; and/or (iv) determining a winner of a hand. In some embodiments, the game server 110 may be operable to authorize the one or more player devices 102 to access such information and/or program instructions remotely via the network 104 and/or download from the game server 110 (e.g., directly or via an intermediary server such as a web server) some or all of the program code for executing one or more of the various functions described in this disclosure. In other embodiments, outcome and result determinations may be carried out by the game server 110 (or another server with which the game server 110 communicates) and the player devices 102 may be terminals for displaying to an associated player such outcomes and results and other graphics and data related to a game.

As described herein, in accordance with some embodiments a software application or program (e.g., a non-authorized software application or program) may be downloaded and/or installed onto a player device. For example, a program for playing a wagering game may be downloaded and/or installed by a player on a player device. Such a software application or program may further comprise one or more software module(s) for directing a processor of the player device to perform certain functions (e.g., to facilitate an efficient installation process by automatically taking the player to a settings screen of the player device, monitoring inputs to the player device to identify when the player has modified a setting to allow installation of non-authorized software applications, and automatically taking the player back to the software application installation screen once the appropriate setting has been modified). In accordance with some embodiments, software components, applications, routines or sub-routines, or sets of instructions for causing one or more processors to perform certain functions may be referred to as "modules". It should be noted that such modules, or any software or computer program referred to herein, may be written in any computer language and may be a portion of a monolithic code base, or may be developed in more discrete code portions, such as is typical in object-oriented computer languages. In addition, the modules, or any software or computer program referred to herein, may in some embodiments be distributed across a plurality of computer platforms, servers, terminals, and the like. For example, a given module may be implemented such that the described functions are performed by separate processors and/or computing hardware platforms.

It should be understood that any of the software module(s) or computer programs described herein may be part of a single program or integrated into various programs for controlling a processor of a computing device. Further, any of the software module(s) or computer programs described herein may be stored in a compressed, uncompiled, and/or encrypted format and include instructions which, when performed by a processor, cause the processor to operate in accordance with at least some of the methods described herein. Of course, additional and/or different software module(s) or computer programs may be included and it should be understood that the example software module(s) described herein are not necessary in any embodiments. Use of the term "module" is not intended to imply that the functionality described with reference thereto is embodied as a stand-alone or independently functioning program or application. While in some embodiments functionality described with respect to a particular module may be independently functioning, in other embodiments such functionality is described with reference to a particular module for ease or convenience of description only and such functionality may in fact be a part of integrated into another module, program, application, or set of instructions for directing a processor of a computing device.

According to some embodiments, the instructions of any or all of the software module(s) or programs described herein may be read into a main memory from another computer-readable medium, such from a ROM to RAM. Execution of sequences of the instructions in the software module(s) or programs may cause a processor to perform at least some of the process steps described herein. In alternate embodiments, hard-wired circuitry may be used in place of, or in combination with, software instructions for implementation of the processes of the embodiments described herein. Thus, the embodiments described herein are not limited to any specific combination of hardware and software.

It should be noted that the one or more player devices 102 may each be located at the same location as at least one other player device 102 (e.g., such as in a casino or internet café) or remote from all other player devices 102. Similarly, any given player device may be located at the same location as the game server 110 or may be remote from the game server 110. It should further be noted that while the game server 110 may be useful or used by any of the player devices 102 to perform certain functions described herein, the game server 110 need not control any of the player devices 102. For example, in one embodiment the game server 110 may comprise a server hosting a website of an online casino (e.g., a gaming establishment comprising an online casino) accessed by one or more of the player devices 102.

In some embodiments, a game server 110 may not be necessary or desirable. For example, some embodiments described in this disclosure may be practiced on one or more player devices 102 without a central authority. In such an embodiment, any functions described herein as performed by a game server 110 and/or data described as stored on a game server 110 may instead be performed by or stored on one or more player devices 102. Additional ways of distributing information and program instructions among one or more player devices 102, a game server 110 and/or another server device will be readily understood by one skilled in the art upon contemplation of the present disclosure.

Figure 2:
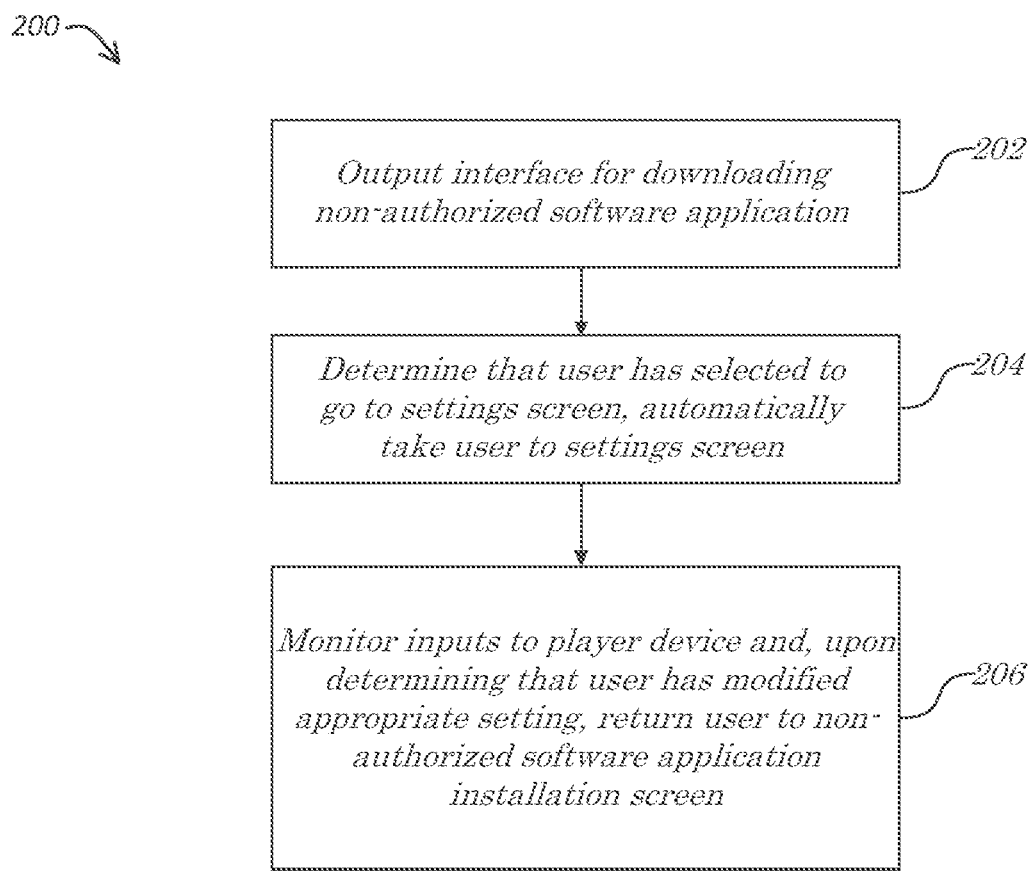
FIG. 2 is a flowchart illustrating one example process, according to one or more embodiments described herein.

Turning now to FIG. 2, illustrated therein is a flowchart of an example process 200, in accordance with some embodiments described herein. The process 200 comprises a process (or portion thereof) for facilitating an improved, more efficient process for downloading and/or installing a non-authorized software application onto a computing device, such as a mobile electronic device (e.g., a smartphone). Process 200 is described herein with reference to the screen shots of FIG. 3A, FIG. 3B, FIG. 3C, FIG. 3D, FIG. 3E, and/or FIG. 3F herein. FIG. 3A, FIG. 3B, FIG. 3C, FIG. 3D, FIG. 3E, and FIG. 3F illustrate, in accordance with some embodiments, information which may be output to a user via a display of a player device or other computing device (e.g., a mobile device such as a smart-phone) while executing or being directed to execute a process, such as process 200.

The process 200 may involve some steps being performed, and some data being received by and/or transmitted to a native operating system or environment of a player device, by a first software application ("first application" herein). The first application may, in accordance with some embodiments, be proprietary to a provider of a non-authorized software application ("non-authorized application" herein) which a user desires to install on his player device. In some embodiments, the first application may comprise a module or subroutine of the non-authorized application (e.g., which is operable to direct the processor of a player device even before the non-authorized application is installed on the player device—e.g., an installation wizard). In other embodiments, the first application may be a distinct application from the non-authorized application the user is attempting to install on the player device. In some embodiments, the first application resides on the player device while in other embodiments the first application is hosted by a remote server (e.g., a server of the gaming establishment which provides the non-authorized application the user is attempting to install on the player device). According to some embodiments, the first application is downloaded onto the mobile electronic device (e.g., from a website or other network location via which the download may be initiated). In some embodiments, the first application comprises an interface of a website of the gaming establishment or other provider of the non-authorized application. Irrespective of whether the first application comprises the non-authorized application and whether the first application resides on the player device or elsewhere, the first application is operable to efficiently guide the user through an installation process (e.g., a "complete" process, including steps required with respect to settings of the native operating system) for installing a non-authorized application on the player device by, e.g., at least, automatically taking the user to the settings screen of the player device and returning the player to the first application to complete the installation upon recognizing that the user has set the appropriate setting to the appropriate value such that installation of non-authorized software applications is enabled or authorized. As such, the first application is generally referred to herein as an "installation wizard" herein and the interfaces of the first application are generally referred to as installation wizard interfaces herein.

Figure 3A:
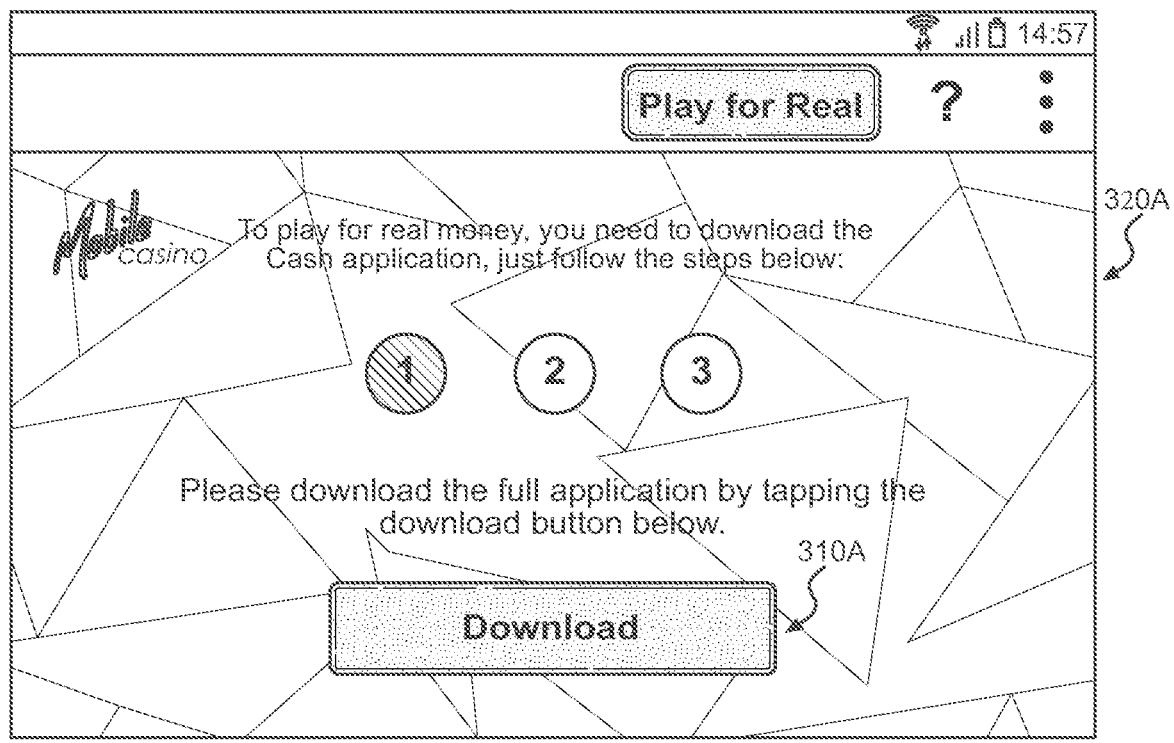
FIG. 3A, FIG. 3B, FIG. 3C, FIG. 3D, FIG. 3E, and FIG. 3F comprise example screen shots of a mobile device, together illustrating how a user may be guided through an installation of a third party software application onto a mobile device, according to one or more embodiments described herein.
Figure 3B:
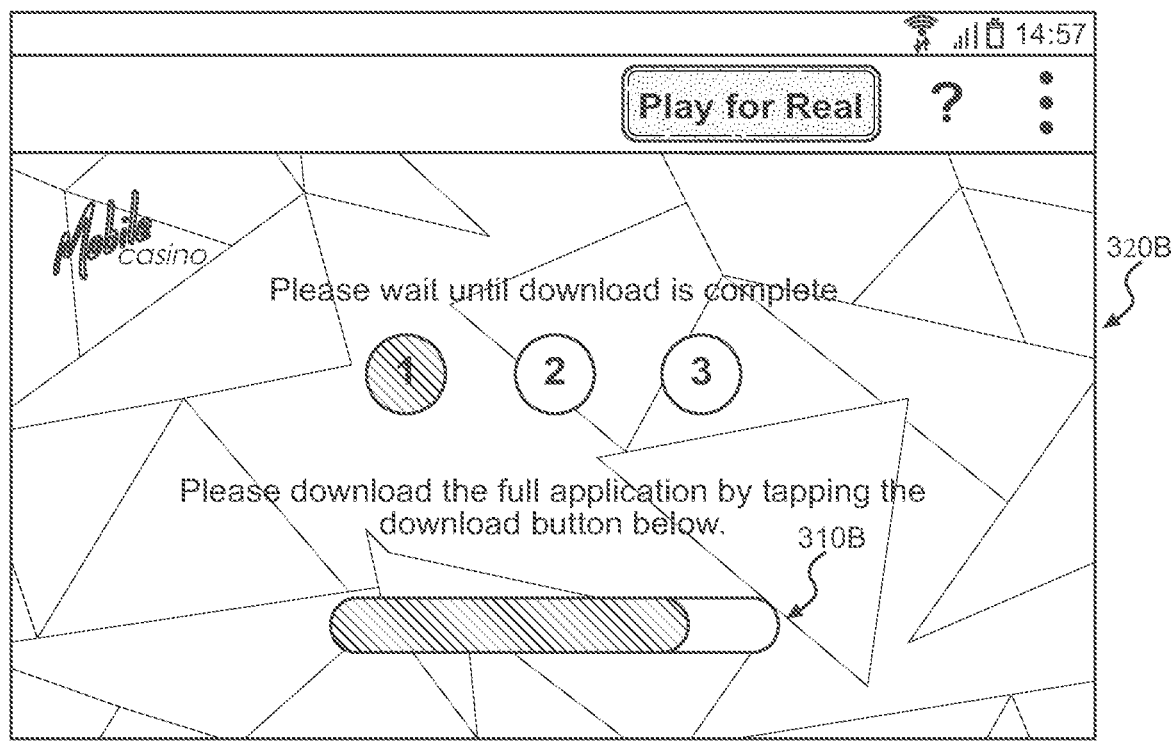
Figure 3C:
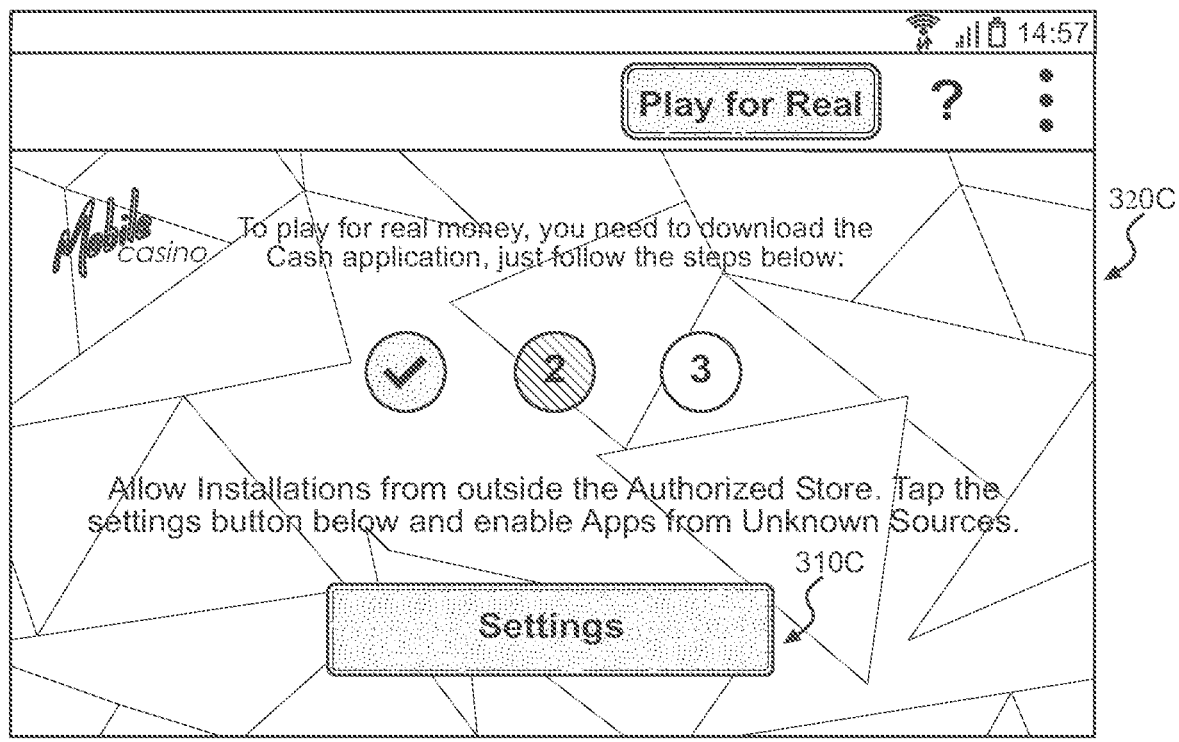
Figure 3D:
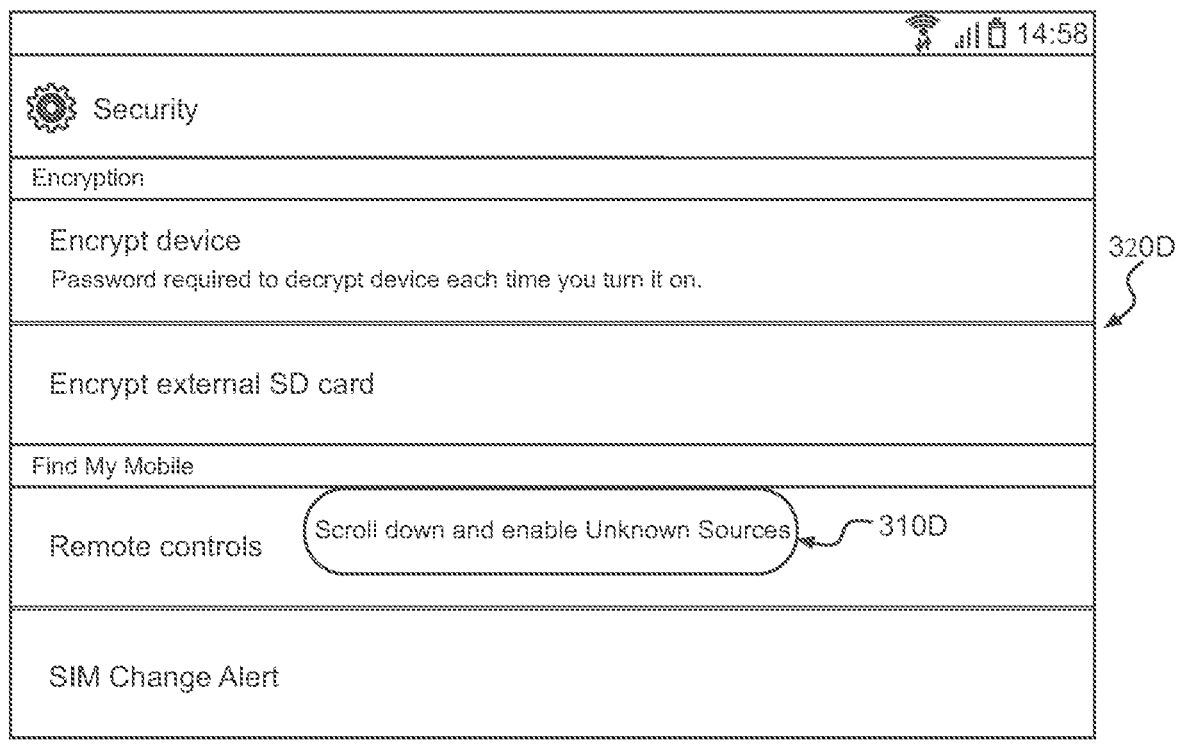
Figure 3E:
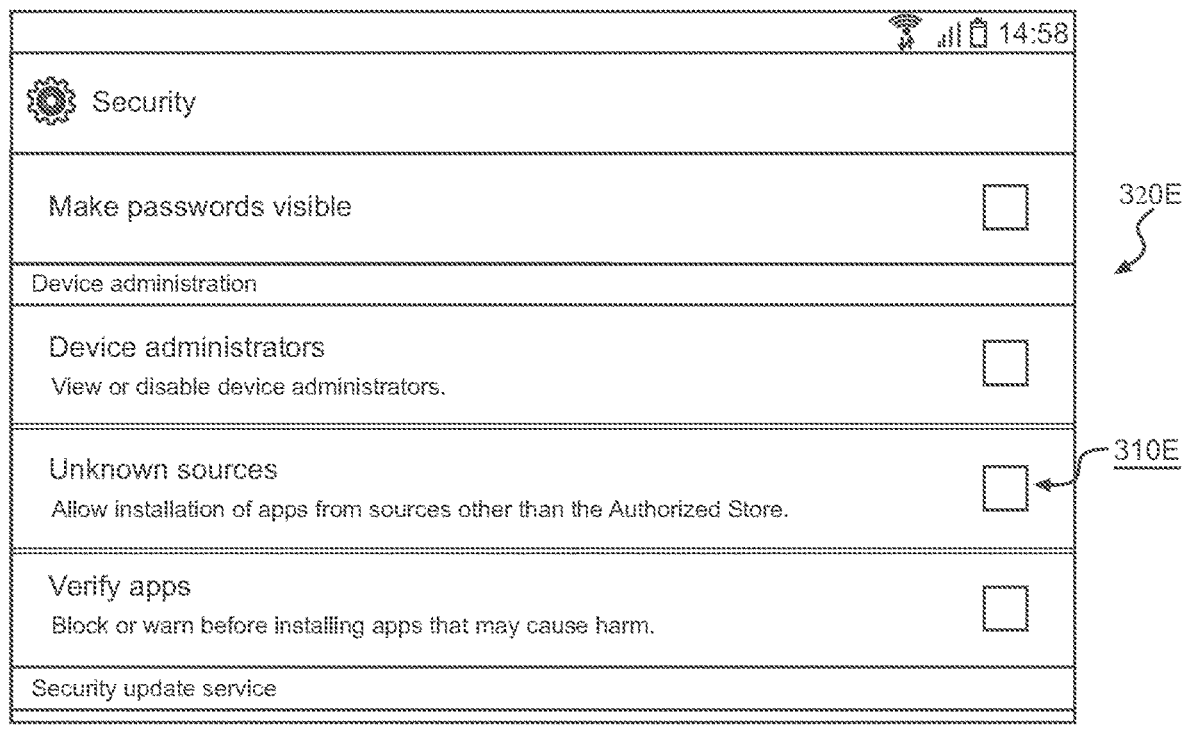
Figure 3F:
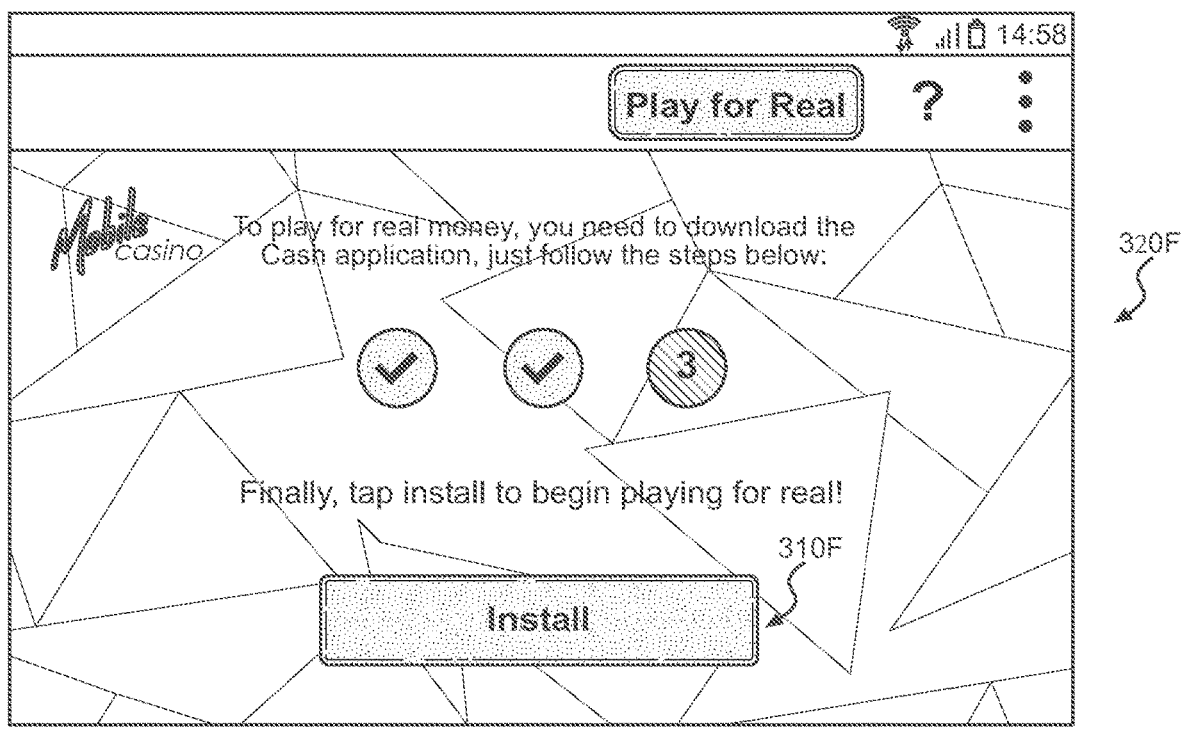

As will be appreciated upon a consideration of FIG. 3A, FIG. 3B, FIG. 3C, FIG. 3D, FIG. 3E, and/or FIG. 3F and the attendant description thereof, in accordance with some embodiments, interfaces output during the process 200 may comprise interfaces of (i) the first application (e.g., the installation wizard); (ii) the non-authorized application (e.g., an online wagering game client); and/or (iii) a native operating system or environment of the player device (e.g., interfaces which the player device is operable to output to the user even without the context of installing the non-authorized application or the process 200). FIG. 3A, FIG. 3B, FIG. 3C, FIG. 3D, FIG. 3E, and/or FIG. 3F may, in accordance with some embodiments, comprise interfaces output via a display device of a player device (e.g., via a web browser or a graphical user interface of a program or application such as the first application and/or the non-authorized application).

With respect to FIG. 2, the process 200 may be executed, for example, by a processor of a player device (e.g., a processing unit of a smart phone or tablet device). In accordance with some embodiments, at least some steps of the process 200 may be performed by the processor under the direction of the first application and/or the non-authorized application (or a module or subroutine of either or both of the foregoing). The process 200 may, for example, begin with or otherwise comprise step 202, in which step an interface for downloading non-authorized software application is output (e.g., on a display of a player device or other computing device). In some embodiments, the interface may comprise an interface of an installation wizard. In one embodiment, the interface may comprise a page of a website of a third party which makes non-authorized software applications available for downloading to player devices. In another example, the interface may comprise an interface of a software application which has already been downloaded and/or installed onto the computing device.

FIG. 3A, FIG. 3B, and FIG. 3C illustrate one example of an interface as it may be modified and output to a user during step 202. In the example of FIG. 3A, an interface 300A comprises an interface which may be output to a player of a game, using a mobile device, which includes an offer to play a wagering version of the game embodied as a non-authorized application (e.g., non-authorized because it is not offered through an authorized virtual retail store supported on the users player device and/or otherwise is not enabled for installation and/or downloading), which non-authorized application the player would first need to download to the player's mobile device. Of course, the embodiments described herein are not limited to facilitating installation of non-authorized software applications comprising wagering games, they may be applied to facilitating installation of any type of non-authorized application. The player may be invited, via interface 300A, to initiate the downloading of the non-authorized application by actuating (e.g., pressing or selecting) an input mechanism embodied as a virtual or soft button 310A included on interface 300A. Illustrated in FIG. 3B is an example interface 300B which comprises the interface 300A as it may be modified once the user actuates the input mechanism 310A. Interface 300B illustrates information which may be output to the user once the user actuates the input mechanism 310A: an output showing progress of the downloading of the non-authorized application is illustrated in the form of progress bar 310B. FIG. 3C illustrates an interface 300C (which may be the interface of FIG. 3B but modified once the downloading of the non-authorized software application is completed).

Next, interface 300C of FIG. 3C illustrates the interface 300B as it may be modified once the downloading of the non-authorized application is complete. In interface 300C, the user is invited to modify the settings of the mobile device such that the installation of the non-authorized software application may be authorized, initiated, and/or completed. An input mechanism in the form of a soft or virtual button 310C comprises an input mechanism which, when actuated or selected by the user, causes a settings screen of the player device to be automatically displayed on a display of the player device. The settings screen may be a screen or interface of the native operating system or environment of the user device. The information output to the user in interface 300C may also include additional instructions or guidance as to which particular setting(s) the user needs to modify in order to allow the non-authorized application to be installed on the user device and/or how to modify the particular setting(s) (e.g., if there is more than one possible value for the particular setting(s), the user may be informed as to which particular setting(s) to modify and what value(s) to set the particular setting(s) to).

Returning to the description of FIG. 2, process 200 may next proceed to or otherwise comprise step 204, in which step it is determined that the user has provided an input indicating that the user would like to be taken to the settings screen (e.g., a menu of available selections output via a particular interface or screen of the player device) of the player device. The appropriate settings screen is automatically opened and outputted to the user on a display of the player device. To facilitate the automatic output of the settings screen of the player device, the installation wizard may transmit or pass data to an operating system of the player device. For example, the installation wizard may transmit an instruction to the processor of the player device to display the settings screen. In one embodiment, the installation wizard may send an "open settings" event to the Operating System ("OS") and the OS may in turn display the settings screen.

It should be noted that it is the installation wizard (or a module thereof) which, in accordance with some embodiments, provides an input mechanism via which the user may indicate that (s)he would like to have the settings screen output and it is the installation wizard (or a module thereof) which, in response to the user actuating the input mechanism, automatically causes the settings screen of the player device to be output to the user via a display of the player device. The user does not need to know how to find the appropriate settings screen on the player device since it is automatically displayed for the user once the user actuates the input mechanism (e.g., such as input mechanism 310C of the interface 300C). In a conventional process prior to the inventive embodiments described herein, a user desiring to install a non-authorized software application may be instructed to go to a settings screen and modify a particular setting to allow installation of non-authorized software applications, but it is then up to the user to find the appropriate settings screen on his player device and open it (i.e., cause it to be displayed by selecting an appropriate menu item from available menus on the player device). Applicant's inventive method bypasses any potential confusion or time delay in having the user manually find and select the settings screen from conventional menus available on the player device by automatically selecting and causing the display of the settings menu in response to a player actuating the relevant input mechanism in an interface of the non-authorized application. For example, a module of the non-authorized application (or a module of another program of a provider of the non-authorized application) may monitor inputs from the user to determine whether the user has actuated an input mechanism such as input mechanism 310C and, upon determining that the user has actuated such an input mechanism, direct the processor of the player device to output the appropriate settings screen of the player device. In some embodiments, the appropriate and/or necessary settings screen(s) and/or settings for a particular device may be determined by querying data stored in a database with respect to identifying information for the mobile electronic device (e.g., a model number, a MAC address, player information or preferences, etc.).

Referring to FIG. 3D, illustrated therein is an example interface 300D comprising an example of a settings screen which may be output to a user once the user has actuated the input mechanism 310C of FIG. 3C. In accordance with some embodiments, the settings screen may be a component or menu of the native operating system or environment of the player device (i.e., not an interface of the installation wizard, although it may be output in response to an instruction from the installation wizard). In one embodiment, causing the settings screen of the player device to be output may comprise causing the settings screen to be output in an unaltered or unmodified form (e.g., to be output as it would be if the user had manually found and selected the settings screen from a menu of options of the player device). In accordance with some embodiments, the settings screen may further be output such that the one or more settings which the user needs to modify in order to authorize the non-authorized software application to be installed on the mobile device are visible on the screen (i.e., the appropriate section of the settings screen may be automatically displayed to the user, in response to an instruction from the installation wizard).

In some embodiments, the settings screen may be modified such that a customized message (e.g., customized for facilitating installation of the non-authorized application which the user is in the process of installing) may be included in the screen. For example, the message may provide instructions or guidance to the user in terms of actions that the user should undertake (e.g., what settings the user should modify and/or how the user should set or modify such settings) in order to proceed with the installation of the non-authorized application. The message may be included in the settings screen, for example, based on an instruction to the processor of the player device from the installation wizard. For example, in one embodiment a notification system built into the OS of the player device may be utilized to display text, an icon, and/or another indication comprising a message which appears over the top of some or all of the interface components and disappears after a set amount of time. Thus, the installation wizard may in some embodiments be operable to cause an output of a message within an area of the settings screen which would not otherwise output the message. FIG. 3D illustrates one example of such a message in area 310D of the settings screen. Area 310D instructs the user to scroll down to a particular setting ("Unknown Sources") and set a value of the setting to a particular value (to "enable" the setting or turn it on). Another example of how a settings screen may be customized or modified when it is output to the player is that the relevant setting and/or value of a setting may be highlighted, enhanced or otherwise indicated to the user. In one embodiment, a message may be output which includes a small screenshot or button to scroll the user to the correct setting, thus highlighting it for the user's attention.

FIG. 3E illustrates an interface 300E, which may comprise an interface, sub-menu or sub-screen of the settings interface illustrated in FIG. 3D (and is thus also, in accordance with some embodiments, an interface which is a component of the native operating system or environment of the player device and not an interface of the installation wizard). In accordance with some embodiments, the user may need to scroll down, drill down or otherwise navigate to a sub-area, sub-screen or sub-menu of the settings screen of the player device to be able to set the appropriate setting. In other embodiments, the screen may automatically be directed to the appropriate sub-area, sub-screen or sub-menu on behalf of the user (e.g., based on an instruction to the processor of the player device from the installation wizard). In accordance with some embodiments, the interface 300E includes an input mechanism 310E (embodied as a binary checkbox or on/off interface) which the user may modify in order to allow installation of non-authorized software applications. In accordance with some embodiments, once the user modifies the setting (e.g., causes the setting to be enabled by actuating the input mechanism 310E), the installation wizard may automatically return the user to an interface of the installation wizard.

Returning again to process 200, for example, in step 206 inputs to the player device are monitored. Such monitoring may be performed, for example, either directly by the installation wizard or by the processor of the player device which then transmits to the installation wizard an indication of inputs or a certain input the installation wizard has requested data for. For example, in one embodiment when a user selects or actuates a "settings" button or area of a screen, this may cause a "listener" to be initiated, which listener listens or monitors for a change to the relevant setting. The listener may listen for changes for a set amount of time (e.g., one (1) minute) and, once it detects that the change to the relevant setting has occurred or been selected, it may send an event to a software application (e.g., the installation wizard), causing a screen of the software application (e.g., the installation wizard) to be automatically displayed. A listener may comprise, for example, a component or tool provided by the OS of the player device which may be operable to indicate to a software application (e.g., the installation wizard) when something in the OS has changed. For example, the listener may be operable to listen for any OS event including user inputs (e.g., taps, swipes) or system outputs (e.g., setting changes).

In step 206, upon determining that user has modified the appropriate setting (e.g., set a value of a setting such that installation of non-authorized applications is authorized or enabled), the installation wizard causes the display of the player device to output or return to the interface for facilitating installation of the non-authorized application (i.e., the settings screen is automatically closed or minimized for the user and the installation wizard screen is automatically opened or maximized upon detecting that the user has modified the settings appropriately). Thus, returning to FIG. 3E, in one embodiment step 206 may comprise determining whether the player has actuated the input mechanism 310E and, upon recognizing that the player has done so, automatically returning the player to an interface of the installation wizard.

FIG. 3F illustrates an example interface 300F which may automatically be output to the user upon it being determined that the user has modified the appropriate setting of the user device to authorize or enable the non-authorized application to be installed on the user device. In accordance with some embodiments, the interface 300F includes an input mechanism 310F which the user may actuate to initiate or complete installation of the non-authorized application (or begin usage, e.g., game play, thereof). Because the user has modified the appropriate setting of the player device to allow or enable installation of the non-authorized application, the installation process may now proceed and/or conclude successfully.

In accordance with some embodiments, process 200 may include an additional step of installing the non-authorized software application. In other embodiments, such a step may be part of another process. For example, installation of the non-authorized software application may be installed automatically on the user device once the user has changed the appropriate setting to allow installation of non-authorized applications on the user device. In one embodiment, once the non-authorized software application is installed (whether automatically or upon initiation by the user), the installation wizard may also take the user through a reverse process in which the setting for allowing non-authorized software applications is adjusted so as to disable the setting and not leave the user or user device vulnerable to installation of non-authorized software applications going forward.

In summary, embodiments described herein provide for an installation process which allows for more efficient and quick downloading and installation of non-authorized software applications. The process provides such increased efficiency and speed by automatically navigating a user between interfaces of the installation wizard and interfaces of the native operating system or environment of the player device rather than merely instruction the user how (s)he may do so manually.

Figure 4B:
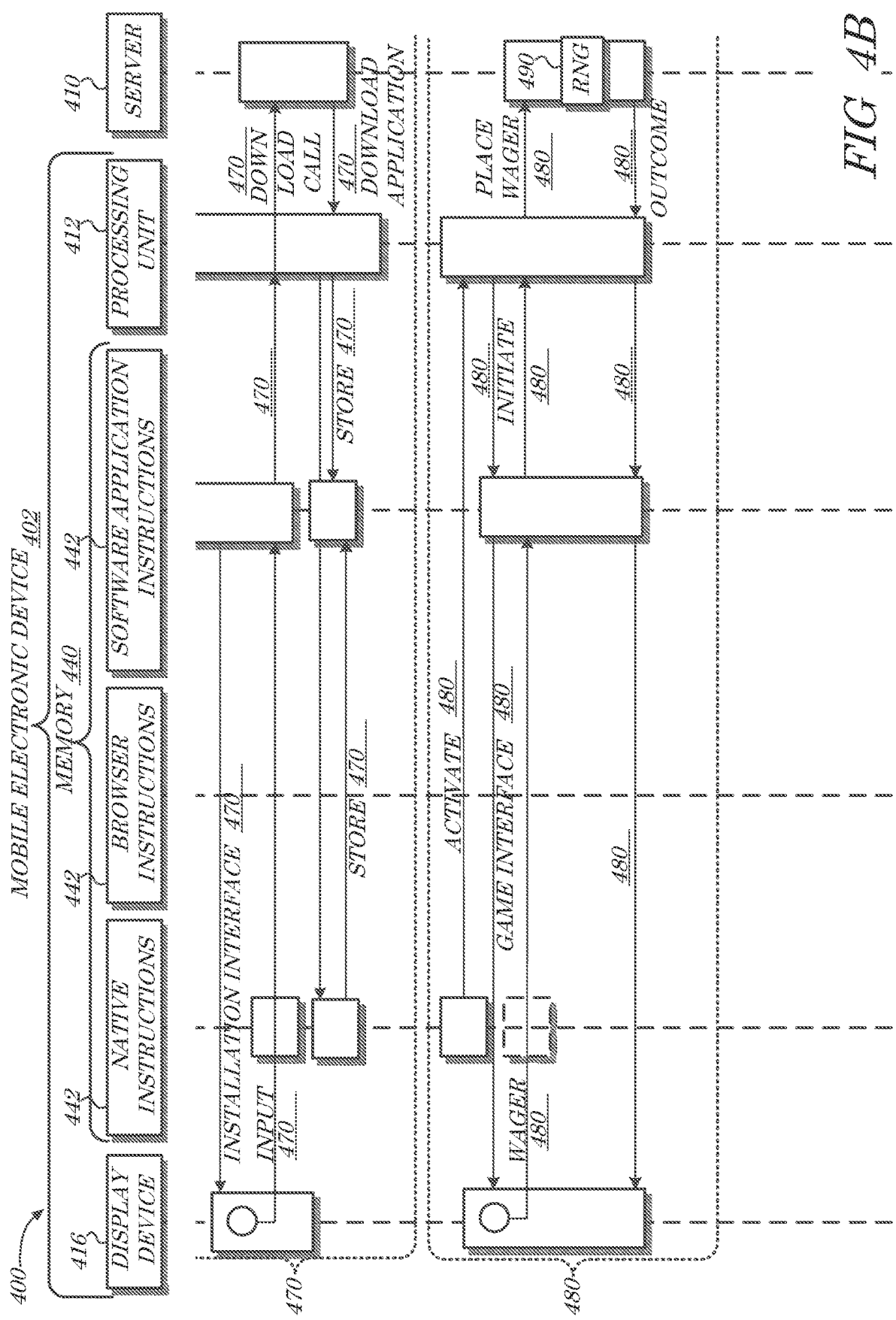

Referring now to FIG. 4A and FIG. 4B, flow diagrams of a computerized processing method 400 according to some embodiments is shown. The method 400, in accordance with some embodiments, may comprise transfer, transmittal, passing, exchanging, and/or providing of data between one or more components of a mobile electronic device 402 and a remote server 410. According to some embodiments such data may also or alternatively be passed between individual and/or specific components of the mobile electronic device 402 such as a processing unit 412, a display device 416, and/or a memory device 440. In some embodiments, the memory device 440 may store and/or comprise a plurality of specialized instruction sets or modules such as operating instruction or "native" instructions 442*a*, browser instructions 442*b*, and/or downloaded application instructions 442*c*.

According to some embodiments, the method 400 may comprise an installation wizard downloading and/or installation, at 460. As depicted in FIG. 4A, the native instructions 442*a* may receive and/or transmit input (e.g., first input) to the processing unit 412, at 460-1. The input, for example, may comprise a user activation request or command for an initiation of the browser instructions 442*b*. According to some embodiments, the processing unit 412 may, e.g., in response to the input/command, send an initiation signal to the browser instructions 442*b*, at 460-2. The initiation signal may, for example, comprise an "open" event or call to initiate the software defined by the browser instructions 442*b*. In some embodiments, the initiation of the browser instructions 442*b* may cause a browser interface to be output by the display device 416, at 460-3. The browser instructions 442*b* may, for example, cause one or more graphical interface commands and/or definitions (e.g., links to media and/or interactive component definitions or content) to be transmitted to the display device 416. According to some embodiments, the display device 416 and/or the native instructions 442*a* may receive and/or detect input, such as second input provided via the browser interface, at 460-4. In some embodiments, the second input may comprise an indication of a network location such as a Uniform Resource Locator (URL). According to some embodiments, the URL (or other network address or indicator) may be passed (e.g., via the browser instructions 442*b*) to the processing unit 412, at 460-5. The processing unit 412 may, in some embodiments, forward or transmit an indication of the URL to the server 410, such as to access content stored or accessible at the network location (e.g., at the sever 410), at 460-6. In some embodiments, the server 410 may (e.g., in response to the transmitting or providing at 460-6) provide, transmit, and/or download an installation wizard to the mobile electronic device 402 (and/or the processing unit 412 thereof), at 460-7. According to some embodiments, the installation wizard may be received by the processing unit 412 and the processing unit 412 may store the installation wizard in the memory 440, e.g., as part of the downloaded application instructions 442*c*, at 460-8. According to some embodiments, the processing unit 412 may utilize and/or invoke the native instructions 442*a* to store the installation wizard, at 460-9.

In some embodiments, the method 400 may comprise execution of a novel installation wizard that automatically assists (or effectuates) a changing of native device settings to allow installation of a non-authorized software application, at 470. As depicted in FIG. 4A, for example, the native instructions 442*a* may receive and/or transmit input (e.g., first input, or third input in the case that the downloading/installation at 460 is performed) to the processing unit 412, at 470-1. The input, for example, may comprise a user activation request or command for an initiation of the installation wizard (e.g., the downloaded application instructions 442*c*). According to some embodiments, the processing unit 412 may, e.g., in response to the input/command, send an initiation signal to the downloaded application instructions 442*c* (and/or the installation wizard thereof), at 470-2. The initiation signal may, for example, comprise an "open" event or call to initiate the software defined by the downloaded application instructions 442*c* (and/or the installation wizard thereof). In some embodiments, the initiation of the downloaded application instructions 442*c* (and/or the installation wizard thereof) may cause a wizard interface (e.g., a first interface, or a second interface in the case that the downloading/installation at 460 is performed) to be output by the display device 416, at 470-3. The downloaded application instructions 442*c* (and/or the installation wizard thereof) may, for example, cause one or more graphical interface commands and/or definitions (e.g., links to media and/or interactive component definitions or content) to be transmitted to the display device 416. In some embodiments, the first or wizard interface may comprise and/or define a first input mechanism and/or first interactive element, "1". According to some embodiments, the display device 416 and/or the native instructions 442*a* may receive and/or detect input (e.g., second input, or fourth input in the case that the downloading/installation at 460 is performed), such as an indication, interaction, and/or command received via the first interactive element, "1", at 470-4. In some embodiments, the input may be received and/or transmitted by the downloaded application instructions 442*c* (and/or the installation wizard thereof) to the processing unit 412.

According to some embodiments, the processing unit 412 may, in response to the input, initiate or launch a settings module, at 470-5. In response to the input received via the first interactive element, "1", of the first/wizard interface defined by the downloaded application instructions 442*c* (and/or the installation wizard thereof), for example, the mobile electronic device 402 may launch a native settings module, such as by the native instructions 442*a* causing an output of a settings interface (e.g., a second interface, or a third interface in the case that the downloading/installation at 460 is performed) via the display device 416, at 470-6. In some embodiments, the second/settings interface may comprise and/or define a second input mechanism and/or second interactive element, "2". According to some embodiments, the display device 416 and/or the native instructions 442*a* may receive and/or detect input (e.g., third input, or fifth input in the case that the downloading/installation at 460 is performed), such as an indication, interaction, and/or command received via the second interactive element, "2", at 470-7.

In some embodiments, the input may be received and/or processed by the native instructions 442*a*, such as to adjust a setting of the mobile electronic device 402, at 470-8. According to some embodiments (as described for example purposes throughout herein), the input may be directed to adjusting a setting of the mobile electronic device 402 that allows or authorized non-authorized software to be downloaded and/or installed in the mobile electronic device 402. In some embodiments, information descriptive of the input and/or the adjustment may be provided to the downloaded application instructions 442*c* (and/or the installation wizard thereof), at 470-9. The downloaded application instructions 442*c* (and/or the installation wizard thereof) may, for example, comprise and/or activate a listener function (defined by the downloaded application instructions 442*c* (and/or the installation wizard thereof) or by the native instructions 442*a*) that reports settings change/adjustment events to the downloaded application instructions 442*c* (and/or the installation wizard thereof).

According to some embodiments, the downloaded application instructions 442*c* (and/or the installation wizard thereof) may, e.g., in response to a detecting or identification of the settings input and/or adjustment, send a signal to the processing device 412, at 470-10. The signal may, for example, cause the processing device 412 to utilize the native instructions 442*a* to close or minimize the second/settings interface, at 470-11. In such a manner, for example, the second/settings interface may be automatically closed or minimized, in response to an instruction from the downloaded application instructions 442*c* (and/or the installation wizard thereof), once any particular (e.g., predefined) setting(s) is adjusted. According to some embodiments, once the second/settings interface is closed or minimized, the downloaded application instructions 442*c* (and/or the installation wizard thereof) may launch an installation interface (e.g., a third interface, or a fourth interface in the case that the downloading/installation at 460 is performed) via the display device 416, at 470-12. According to some embodiments, and as depicted by the dotted line connecting the first/wizard interface and the third/installation interface in FIG. 4A and FIG. 4B, the first/wizard interface and the third/installation interface may be the same interface. The first/wizard interface may be minimized while the second/settings interface is displayed, for example, and once the setting is adjusted, the first/wizard interface may be maximized or re-displayed, e.g., as the third/installation interface. In some embodiments, the third/installation interface may comprise and/or define a third input mechanism and/or third interactive element, "3". According to some embodiments, the display device 416 and/or the native instructions 442*a* may receive and/or detect input (e.g., fourth input, or sixth input in the case that the downloading/installation at 460 is performed), such as an indication, interaction, and/or command received via the third interactive element, "3", at 470-13.

In some embodiments, the downloaded application instructions 442*c* (and/or the installation wizard thereof) and/or the native instructions 442*a* may transmit or send an indication of the input to the processing unit 412, at 470-14. The processing unit 412 may, in response to receiving such input, initiate communications with the server 410. The processing unit 412 may, for example, transmit a download call or command to the server 410, at 470-15. In some embodiments, the server 410 may be responsive to the download call, and may transmit back to the mobile electronic device 402 and/or the processing unit 412 thereof information defining a downloading of the downloaded application instructions 442*c*, at 470-16. According to some embodiments, the downloaded application instructions 442*c* may be received by the processing unit 412 and the processing unit 412 may store the downloaded application instructions 442*c* in the memory 440, at 470-17. According to some embodiments, the processing unit 412 may utilize and/or invoke the native instructions 442*a* to store the downloaded application instructions 442*c*, at 470-18.

According to some embodiments, the method 400 may comprise executing the downloaded application instructions 442*c*, such as in the case that the downloaded application instructions 442*c* comprise and/or define an online wagering game (or client thereof), at 480. As depicted in FIG. 4B, for example, the native instructions 442*a* may receive and/or transmit input (e.g., fifth input, or seventh input in the case that the downloading/installation at 460 is performed) to the processing unit 412, at 480-1. The input, for example, may comprise a user activation request or command for an initiation of the downloaded application instructions 442*c*. According to some embodiments, the processing unit 412 may, e.g., in response to the input/command, send an initiation signal to the downloaded application instructions 442*c*, at 480-2. The initiation signal may, for example, comprise an "open" event or call to initiate the software defined by the downloaded application instructions 442*c*. In some embodiments, the initiation of the downloaded application instructions 442*c* may cause a game interface (e.g., a fourth interface, or a fifth interface in the case that the downloading/installation at 460 is performed) to be output by the display device 416, at 480-3. The downloaded application instructions 442*c* may, for example, cause one or more graphical interface commands and/or definitions (e.g., links to media and/or interactive component definitions or content) to be transmitted to the display device 416. In some embodiments, the fourth/game interface may comprise and/or define a fourth input mechanism and/or fourth interactive element, "4". According to some embodiments, the display device 416, the downloaded application instructions 442*c*, and/or the native instructions 442*a* may receive and/or detect input (e.g., sixth input, or eighth input in the case that the downloading/installation at 460 is performed), such as an indication, interaction, and/or command received via the fourth interactive element, "4", at 480-4. In some embodiments, the input may be received and/or transmitted by the downloaded application instructions 442*c* to the processing unit 412, at 480-5. According to some embodiments, the processing unit 412 may forward or transmit an indication of the input to the server 410. In the case that the input defines a wager to be placed in an online wagering game, for example, the wager may be placed by a transmission to the server 410 of information defining the wager, at 480-6. In some embodiments, the server 410 may be responsive to the receiving of the wager to initiate and/or conduct an online wagering game (or a portion thereof, such as a session, round, or hand of a game). The server 410 may, for example, utilize a random number generator 490 to determine one or more random outcomes of an online wagering game, e.g., in response to and/or based on the placed wager. In some embodiments, the server 410 may transmit an indication of the one or more game outcomes to the mobile electronic device 402 and/or the processing unit 412 thereof, at 480-7. According to some embodiments, the processing unit 412 may forward information indicative of and/or defining the outcome to the downloaded application instructions 442*c*, at 480-8. In some embodiments, the downloaded application instructions 442*c* may cause an indication of the one or more outcomes to be displayed via the fourth/game interface, via the display device 416, at 480-9. In such a manner, for example, a non-authorized software application such as an online wagering application (e.g., client) may be downloaded, authorized, installed, and executed such that a player/user of the mobile electronic device 402 may participate in an online wagering game, even in the case that the mobile electronic device 402 comprises a restricted access and/or closed operating system environment.

According to some embodiments, the downloading and/or installation of the installation wizard at 460 may not be desirable or necessary in the method 400, or may be accomplished in other manners that are or become known or practicable (e.g., the browser instructions 442*b* may not be required). Similarly, in some embodiments the execution of the downloaded and, e.g., non-authorized application software, at 480, may comprise execution of an application other than an online wagering game as described for exemplary purposes herein.

Figure 5:
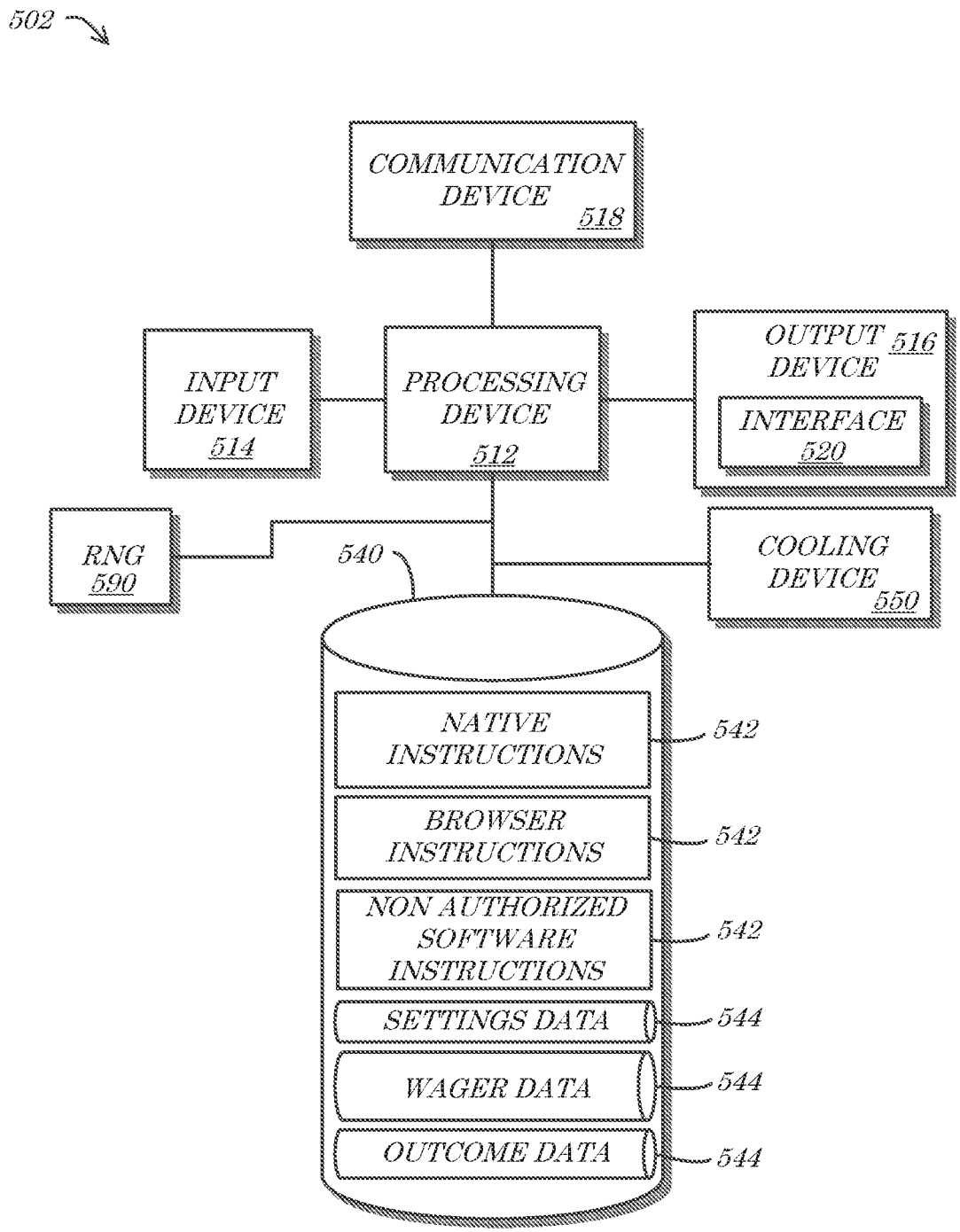
FIG. 5 is a block diagram of an apparatus according to some embodiments.
Figure 6A:
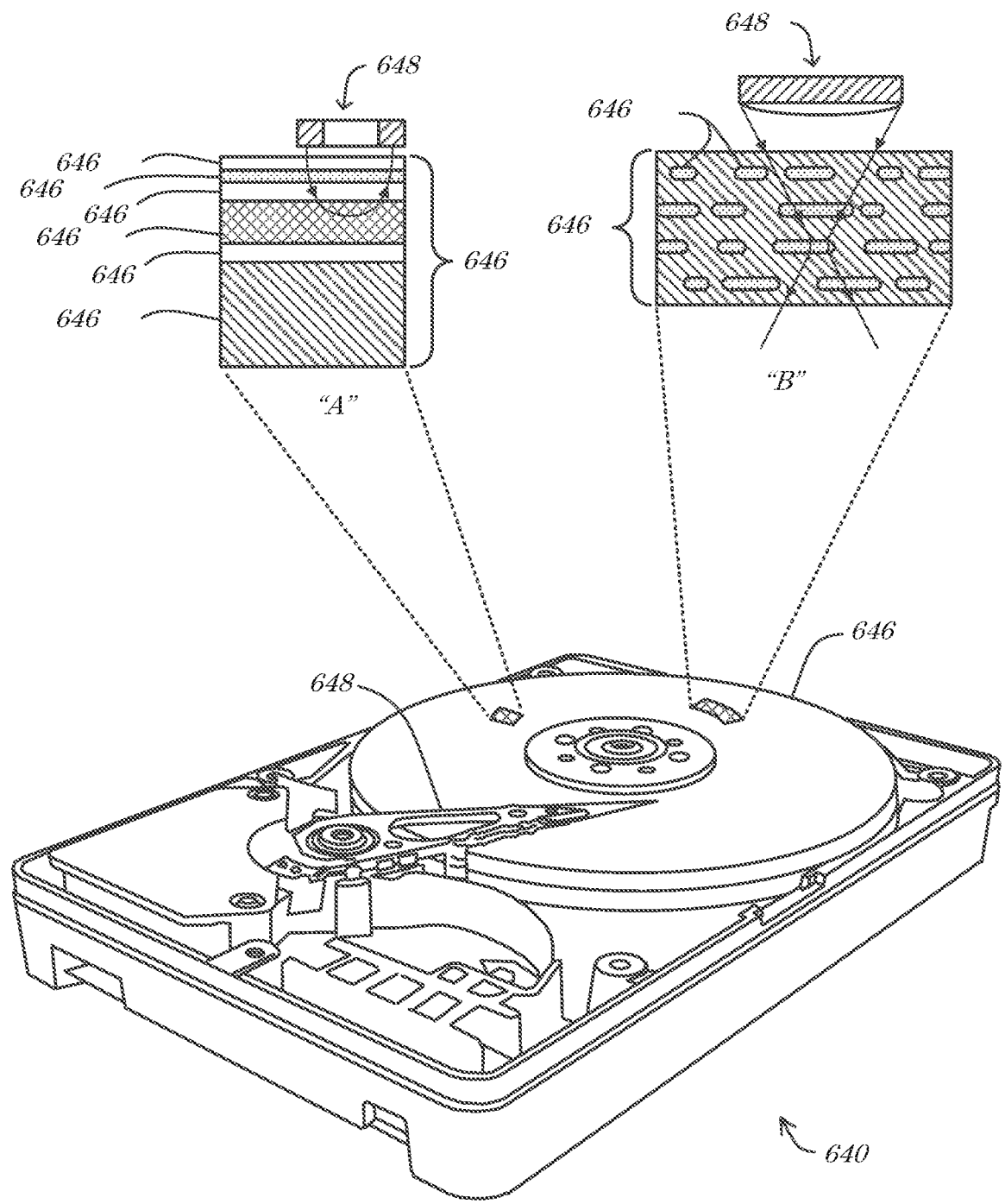
FIG. 6A, FIG. 6B, FIG. 6C, FIG. 6D, and FIG. 6E are perspective diagrams of exemplary data storage devices according to some embodiments.
Figure 6B:
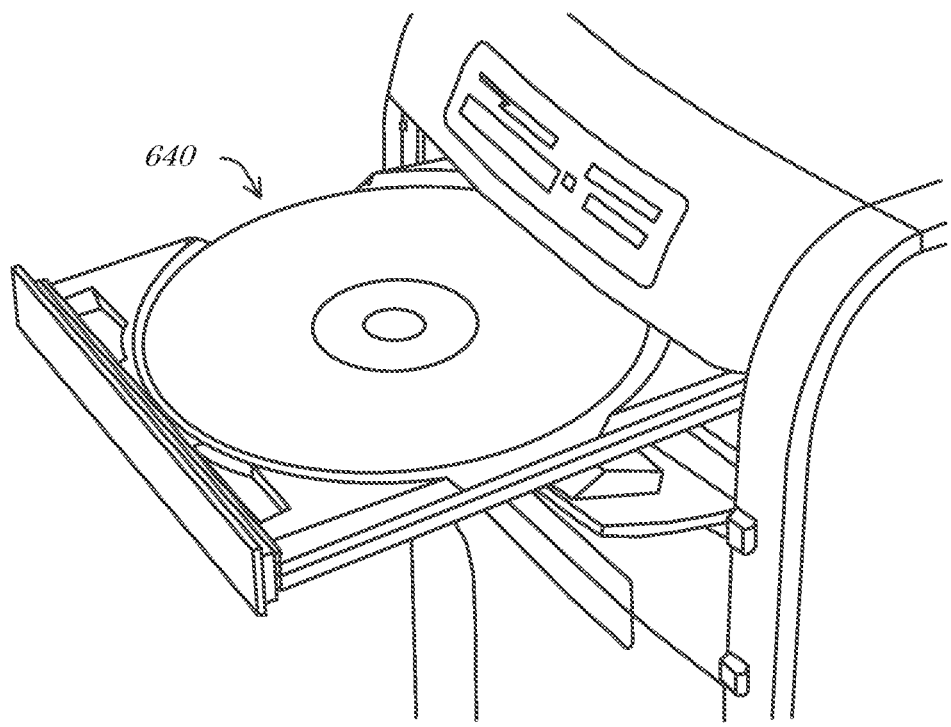
Figure 6C:
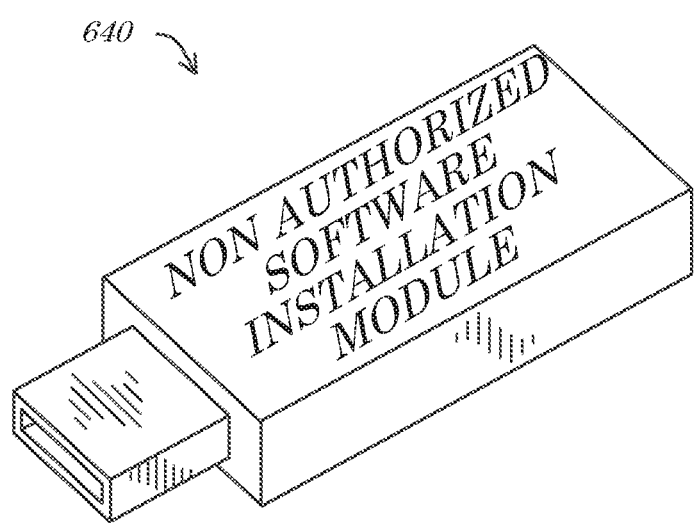
Figure 6D:
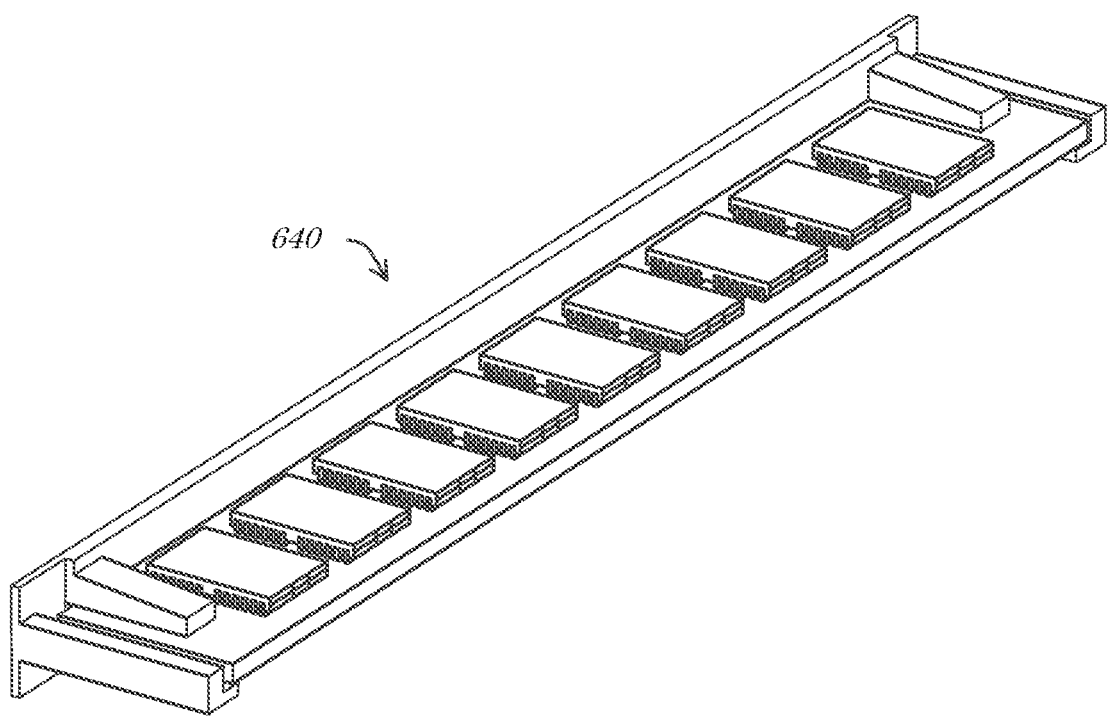
Figure 6E:
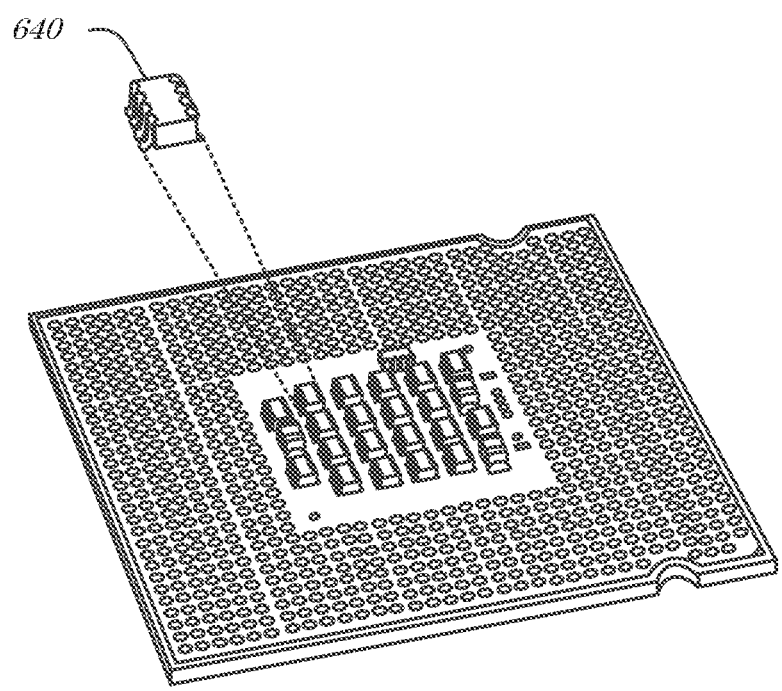

Referring now to FIG. 5, a block diagram of an apparatus 502 according to some embodiments is shown. In some embodiments, the apparatus 502 may be similar in configuration and/or functionality to any of the player or mobile devices 102*a-n*, 402 and/or the servers 110, 410 of FIG. 1 and/or FIG. 4A and/or FIG. 4B herein, and/or may otherwise comprise a portion of the system 100 and/or the methods 200, 400 of FIG. 1, FIG. 2 and/or FIG. 4A and/or FIG. 4B herein. The apparatus 502 may, for example, execute, process, facilitate, and/or otherwise be associated with the methods 200, 400 of FIG. 2 and/or FIG. 4A and/or FIG. 4B herein, and/or one or more portions and/or combinations thereof. In some embodiments, the apparatus 502 may comprise a processing device 512, an input device 514, an output device 516, a communication device 518, an interface 520, a memory device 540 (storing various programs and/or instructions 542 and data 544), a cooling device 550, and/or a Random Number Generator (RNG) 590. According to some embodiments, any or all of the components 512, 514, 516, 518, 520, 540, 542, 544, 550, 590 of the apparatus 502 may be similar in configuration and/or functionality to any similarly named and/or numbered components described herein. Fewer or more components 512, 514, 516, 518, 520, 540, 542, 544, 550, 590 and/or various configurations of the components 512, 514, 516, 518, 520, 540, 542, 544, 550, 590 be included in the apparatus 502 without deviating from the scope of embodiments described herein.

According to some embodiments, the processing device 512 may be or include any type, quantity, and/or configuration of electronic and/or computerized processor that is or becomes known. The processing device 512 may comprise, for example, an Intel® IXP 2800 network processor or an Intel® XEON™ Processor unit coupled with an Intel® E7501 chipset. In some embodiments, the processing device 512 may comprise multiple inter-connected units, processors, microprocessors, and/or micro-engines. According to some embodiments, the processing device 512 (and/or the apparatus 502 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 502 comprises a server such as a blade server, necessary power may be supplied via a standard AC outlet, power strip, surge protector, a PDU, and/or Uninterruptible Power Supply (UPS) device.

In some embodiments, the input device 514 and/or the output device 516 are communicatively coupled to the processing device 512 (e.g., via wired and/or wireless connections and/or pathways) and they may generally comprise any types or configurations of input and output components and/or devices that are or become known, respectively. The input device 514 may comprise, for example, a keyboard that allows an operator of the apparatus 510 to interface with the apparatus 510 (e.g., by a player, such as to participate in a wagering game as described herein). In some embodiments, the input device 514 may comprise a sensor configured to provide information such as player input to the apparatus 502 and/or the processing device 512. The output device 516 may, according to some embodiments, comprise a display screen and/or other practicable output component and/or device. The output device 516 may, for example, provide the interface 520 to a player (e.g., via a website, electronic communications network device, and/or non-authorized software application; e.g., the interfaces 320a-f of FIG. 3A, FIG. 3B, FIG. 3C, FIG. 3D, FIG. 3E, and/or FIG. 3F herein). According to some embodiments, the input device 514 and/or the output device 516 may comprise and/or be embodied in a single device such as a touch-screen monitor (e.g., a device capable of both receiving input and providing output; e.g., via the interface 520).

In some embodiments, the communication device 518 may comprise any type or configuration of communication device that is or becomes known or practicable. The communication device 518 may, for example, comprise a Network Interface Card (NIC), a telephonic device, a cellular network device, a router, a hub, a modem, and/or a communications port or cable. In some embodiments, the communication device 518 may be coupled to provide data to a remote device (not shown in FIG. 5), such as in the case that the apparatus 502 is utilized to provide the interface 520 to a player as a client-side application of an online wagering game hosted by a remote server, as described herein. The communication device 518 may, for example, comprise a cellular telephone network transmission device that receives (and/or sends) signals indicative of game interface components to customer and/or subscriber handheld, mobile, and/or telephone device, e.g., from a remote server device. According to some embodiments, the communication device 518 may also or alternatively be coupled to the processing device 512. In some embodiments, the communication device 518 may comprise an IR, RF, Bluetooth™, NFC, and/or Wi-Fi® network device coupled to facilitate communications between the processing device 512 and another device (such as a third-party device, not shown).

The memory device 540 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 540 may, according to some embodiments, store one or more of operating system (e.g., closed or restricted operating system) or native instructions 542-1, browser instructions 542-2, non-authorized software instructions 542-3, settings data 544-1, wager data 544-2, and/or outcome data 544-3. In some embodiments, the native instructions 542-1, browser instructions 542-2, non-authorized software instructions 542-3, settings data 544-1, wager data 544-2, and/or outcome data 544-3 may be utilized by the processing device 512 to provide output information via the output device 516 and/or the communication device 518.

According to some embodiments, the native instructions 542-1 may be operable to cause the processing device 512 to process settings data 544-1, wager data 544-2, and/or outcome data 544-3. Settings data 544-1, wager data 544-2, and/or outcome data 544-3 received via the input device 514 and/or the communication device 518 may, for example, be analyzed, sorted, filtered, decoded, decompressed, ranked, scored, plotted, and/or otherwise processed by the processing device 512 in accordance with the native instructions 542-1. In some embodiments, settings data 544-1, wager data 544-2, and/or outcome data 544-3 may be fed by the processing device 512 through one or more mathematical and/or statistical formulas and/or models in accordance with the native instructions 542-1 to provide settings interfaces and adjustment capabilities for mobile electronic devices (e.g., the apparatus 502) in accordance with embodiments described herein.

In some embodiments, the browser instructions 542-2 may be operable to cause the processing device 512 to process settings data 544-1, wager data 544-2, and/or outcome data 544-3. Settings data 544-1, wager data 544-2, and/or outcome data 544-3 received via the input device 514 and/or the communication device 518 may, for example, be analyzed, sorted, filtered, decoded, decompressed, ranked, scored, plotted, and/or otherwise processed by the processing device 512 in accordance with the browser instructions 542-2. In some embodiments, settings data 544-1, wager data 544-2, and/or outcome data 544-3 may be fed by the processing device 512 through one or more mathematical and/or statistical formulas and/or models in accordance with the browser instructions 542-2 to provide network navigation and/or download capabilities in accordance with embodiments described herein.

According to some embodiments, the non-authorized software instructions 542-3 may be operable to cause the processing device 512 to process settings data 544-1, wager data 544-2, and/or outcome data 544-3. Settings data 544-1, wager data 544-2, and/or outcome data 544-3 received via the input device 514 and/or the communication device 518 may, for example, be analyzed, sorted, filtered, decoded, decompressed, ranked, scored, plotted, and/or otherwise processed by the processing device 512 in accordance with the non-authorized software instructions 542-3. In some embodiments, settings data 544-1, wager data 544-2, and/or outcome data 544-3 may be fed by the processing device 512 through one or more mathematical and/or statistical formulas and/or models in accordance with the non-authorized software instructions 542-3 (e.g., and/or an installation wizard module or component thereof) to facilitate, manage, and/or automatically enable the downloading and/or installation of non-authorized software on a mobile electronic device (e.g., the apparatus 502) in accordance with embodiments described herein.

Any or all of the exemplary instructions and data types described herein and other practicable types of data may be stored in any number, type, and/or configuration of memory devices that is or becomes known. The memory device 540 may, for example, comprise one or more data tables or files, databases, table spaces, registers, and/or other storage structures. In some embodiments, multiple databases and/or storage structures (and/or multiple memory devices 540) may be utilized to store information associated with the apparatus 502. According to some embodiments, the memory device 540 may be incorporated into and/or otherwise coupled to the apparatus 502 (e.g., as shown) or may simply be accessible to the apparatus 502 (e.g., externally located and/or situated).

In some embodiments, the apparatus 502 may comprise the cooling device 550. According to some embodiments, the cooling device 550 may be coupled (physically, thermally, and/or electrically) to the processing device 512 and/or to the memory device 540. The cooling device 550 may, for example, comprise a fan, heat sink, heat pipe, radiator, cold plate, and/or other cooling component or device or combinations thereof, configured to remove heat from portions or components of the apparatus 502.

According to some embodiments, the apparatus 502 may comprise the RNG 590. The RNG 590 may comprise, for example, a specially-configured device and/or module for generating random (or pseudo random) numbers, e.g., in accordance with applicable regulations pertaining to gambling or wagering activities. The RNG 590 may comprise, for example, a secure and/or tamper resistant (or tamper evident) module that is inspected and/or approved by a regulatory entity for generating random outcomes for online wagering games.

Referring now to FIG. 6A, FIG. 6B, FIG. 6C, FIG. 6D, and FIG. 6E, perspective diagrams of exemplary data storage devices 640*a-e* according to some embodiments are shown. The data storage devices 640*a-e* may, for example, be utilized to store instructions and/or data such as the native instructions 542-1, browser instructions 542-2, non-authorized software instructions 542-3, settings data 544-1, wager data 544-2, and/or outcome data 544-3, each of which is described in reference to FIG. 5 herein. In some embodiments, instructions stored on the data storage devices 640*a-e* may, when executed by a processor, cause the implementation of and/or facilitate the methods 200, 300 of FIG. 2 and/or FIG. 4A and/or FIG. 4B herein, and/or portions and/or combinations thereof.

According to some embodiments, the first data storage device 640*a* may comprise one or more various types of internal and/or external hard drives. The first data storage device 640*a* may, for example, comprise a data storage medium 646 that is read, interrogated, and/or otherwise communicatively coupled to and/or via a disk reading device 648. In some embodiments, the first data storage device 640*a* and/or the data storage medium 646 may be configured to store information utilizing one or more magnetic, inductive, and/or optical means (e.g., magnetic, inductive, and/or optical-encoding). The data storage medium 646, depicted as a first data storage medium 646*a* for example (e.g., breakout cross-section "A"), may comprise one or more of a polymer layer 646*a*-1, a magnetic data storage layer 646*a*-2, a non-magnetic layer 646*a*-3, a magnetic base layer 646*a*-4, a contact layer 646*a*-5, and/or a substrate layer 646*a*-6. According to some embodiments, a magnetic read head 646*a* may be coupled and/or disposed to read data from the magnetic data storage layer 646*a*-2.

In some embodiments, the data storage medium 646, depicted as a second data storage medium 646*b* for example (e.g., breakout cross-section "B"), may comprise a plurality of data points 646*b*-2 disposed with the second data storage medium 646*b*. The data points 646*b*-2 may, in some embodiments, be read and/or otherwise interfaced with via a laser-enabled read head 648*b* disposed and/or coupled to direct a laser beam through the second data storage medium 646*b*.

In some embodiments, the second data storage device 640*b* may comprise a CD, CD-ROM, DVD, Blu-Ray™ Disc, and/or other type of optically-encoded disk and/or other storage medium that is or becomes known or practicable. In some embodiments, the third data storage device 640*c* may comprise a USB keyfob, dongle, and/or other type of flash memory data storage device that is or becomes know or practicable. In some embodiments, the fourth data storage device 640*d* may comprise RAM of any type, quantity, and/or configuration that is or becomes practicable and/or desirable. In some embodiments, the fourth data storage device 640*d* may comprise an off-chip cache such as a Level 2 (L2) cache memory device. According to some embodiments, the fifth data storage device 640*e* may comprise an on-chip memory device such as a Level 1 (L1) cache memory device.

The data storage devices 640*a-e* may generally store program instructions, code, and/or modules (e.g., a combination of native instructions and downloaded and/or non-authorized software instructions) that, when executed by a processing device cause a particular machine to function in accordance with one or more embodiments described herein. The data storage devices 640*a-e* depicted in FIG. 6A, FIG. 6B, FIG. 6C, FIG. 6D, and FIG. 6E are representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

In some embodiments, one or more specialized machines such as a computerized processing device, a server, a remote terminal, and/or a customer device may implement the various practices described herein. A computer system of an game provider may, for example, comprise various specialized computers that interact to provide for bingo-style games as described herein.

Certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Various embodiments described herein provide advantages in computer processing. The number of online gaming transactions that can effectively be input, processed, and output in accordance with embodiments herein, for example, would not be possible without implementation of such embodiments in a specialized computer processing system. Such a system as described herein may, for example, enable processing of tens, hundreds, and/or thousands of gaming transactions in minutes, hours, or within a day, while such processing would not be possible in the absence of such a system. For convenience, such a specially-programmed system may be referred to herein as a "specialized computer processing system". In other words, embodiments conducted by a specialized computer processing system may not be possible to achieve in the absence of such a system and/or the speed at which such a system operates would simply not be reproducible by other available means. As a non-limiting example, a specialized computer processing system herein may be capable of receiving input descriptive of, processing, and outputting sorted bingo card win conditions to one thousand (1000) players in less than one (1) hour.

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "and/or", when such term is used to modify a list of things or possibilities (such as an enumerated list of possibilities) means that any combination of one or more of the things or possibilities is intended, such that while in some embodiments any single one of the things or possibilities may be sufficient in other embodiments two or more (or even each of) the things or possibilities in the list may be preferred, unless expressly specified otherwise. Thus for example, a list of "a, b and/or c" means that any of the following interpretations would be appropriate: (i) each of "a", "b" and "c"; (ii) "a" and "b"; (iii) "a" and "c"; (iv) "b" and "c"; (v) only "a"; (vi) only "b"; and (vii) only "c."

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component or article is described herein, more than one device, component or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component or article is described herein (whether or not they cooperate), a single device, component or article may alternatively be used in place of the more than one device, component or article that is described. For example, a plurality of computer-based devices may be substituted with a single computer-based device. Accordingly, the various functionality that is described as being possessed by more than one device, component or article may alternatively be possessed by a single device, component or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A method for automatically managing an authorization of a non-authorized software application on a mobile electronic device, comprising:
    initiating, by a processing unit of a mobile electronic device and via execution of stored instructions native to an operating system of the mobile electronic device, an application installation wizard module for a software application that is not authorized for installation on the electronic mobile device;
    outputting, by the processing unit of the mobile electronic device, via a display device, and via execution of stored instructions defined by the application installation wizard module, a first interface comprising a first interactive element for causing a settings screen of the mobile electronics device to be selectively displayed;
    receiving, by the processing unit of the mobile electronics device and via the first interactive element of the first interface, a first initiation command directed to causing the settings screen of the mobile electronics device to be selectively displayed;
    outputting, by the processing unit of the mobile electronic device, via the display device, in place of the first interface, in response to the receiving of the first initiation command, and via execution of stored instructions native to the operating system of the mobile electronic device, a second interface comprising the settings screen of the mobile electronics device, the second interface comprising a second interactive element for causing a software authorization setting of the mobile electronic device to be adjusted;
    receiving, by the processing unit of the mobile electronics device and via the second interactive element of the second interface, a second initiation command directed to causing the authorization setting of the mobile electronic device to be adjusted;
    adjusting, by the processing unit of the mobile electronic device, in response to the receiving of the second initiation command, and via execution of stored instructions native to the operating system of the mobile electronic device, the authorization setting of the mobile electronic device; and
    outputting, by the processing unit of the mobile electronic device, via the display device, in place of the second interface, in response to the adjusting of the authorization setting of the mobile electronic device, and via execution of stored instructions defined by the application installation wizard module, a third interface comprising a third interactive element for causing an installation of the software application.

2. The method of claim 1, wherein the initiating is conducted in response to, and the method further comprising:
    receiving, by the processing unit of the mobile electronic device and via a browser application executed by the processing unit of the mobile electronic device, and from an input device of the mobile electronic device, an indication of a network address associated with the application installation wizard module of the software application that is not authorized for installation on the electronic mobile device; and
    navigating, by the processing unit of the mobile electronic device and via the browser application executed by the processing unit of the mobile electronic device, to the network address associated with the application installation wizard module of the software application that is not authorized for installation on the electronic mobile device.

3. The method of claim 1, further comprising:
    receiving, by the processing unit of the mobile electronics device and via the third interactive element of the third interface, a third initiation command directed to causing the installation of the software application;
    installing, by the processing unit of the mobile electronic device, in response to the receiving of the third initiation command, and via execution of stored instructions defined by the application installation wizard module, the software application.

4. The method of claim 3, further comprising:
    initiating, by the processing unit of the mobile electronic device and via execution of stored instructions native to the operating system of the mobile electronic device, the software application;
    outputting, by the processing unit of the mobile electronic device, via the display device, and in response to the initiating of the software application, and via execution of stored instructions defined by the software application, a fourth interface comprising a fourth interactive element for placing a wager in an online wagering game;
    receiving, by the processing unit of the mobile electronics device and via the fourth interactive element of the fourth interface, a fourth initiation command directed to placing the wager in the online wagering game;
    transmitting, by the processing unit of the mobile electronic device, in response to the receiving of the fourth initiation command, and via execution of stored instructions defined by the software application, and to a remote online wagering game server, an indication of the wager to be placed in the online wagering game;

receiving, by the processing unit of the mobile electronic device, in response to the transmitting of the indication of the wager to be placed in the online wagering game, and via execution of stored instructions defined by the software application, and from the remote online wagering game server, an indication of an outcome of the wager being placed in the online wagering game; and outputting, by the processing unit of the mobile electronic device, via the display device, and in response to the receiving of the outcome, and via execution of stored instructions defined by the software application, a fifth interface comprising a graphical representation of the outcome of the wager having been placed in the online wagering game.

5. The method of claim 1, wherein the outputting, by the processing unit of the mobile electronic device, via the display device, in place of the second interface, in response to the adjusting of the authorization setting of the mobile electronic device, and via execution of stored instructions defined by the application installation wizard module, of the third interface, comprises:

executing, by the processing unit of the mobile electronic device and via execution of stored instructions defined by the application installation wizard module, a listener process that monitors events of the mobile electronic device to detect at least one of the second initiation command and the adjusting of the authorization setting of the mobile electronic device;

detecting, by the processing unit of the mobile electronic device and via execution of stored instructions defined by the listener process of the application installation wizard module, the at least one of the second initiation command and the adjusting of the authorization setting of the mobile electronic device; and outputting, by the processing unit of the mobile electronic device, via the display device, in response to the detecting, and via execution of stored instructions defined by the application installation wizard module, the third interface.

6. The method of claim 1, wherein the outputting of the second interface comprising the settings screen of the mobile electronics device, further comprises:

outputting, by the processing unit of the mobile electronic device, via the display device, and via execution of stored instructions defined by the application installation wizard module, an augmented portion of the second interface comprising instructions for adjusting the software authorization setting of the mobile electronic device.

7. The method of claim 6, wherein the augmented portion comprises one or more graphical elements overlaid on the second interface at a position of the second interface that corresponds to a position of the second interactive element.

8. The method of claim 6, wherein the augmented portion comprises human-readable information suggesting a value to input into the second interactive element.

* * * * *